(12) United States Patent
Kennett et al.

(10) Patent No.: US 9,052,746 B2
(45) Date of Patent: Jun. 9, 2015

(54) USER CENTER-OF-MASS AND MASS DISTRIBUTION EXTRACTION USING DEPTH IMAGES

(71) Applicant: Microsoft Corporation, Redmond, WA (US)

(72) Inventors: Daniel Kennett, Bellevue, WA (US); Jonathan Hoof, Kenmore, WA (US); Anis Ahmad, Kirkland, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 247 days.

(21) Appl. No.: 13/768,400

(22) Filed: Feb. 15, 2013

(65) Prior Publication Data

US 2014/0232650 A1 Aug. 21, 2014

(51) Int. Cl.
*G06F 3/033* (2013.01)
*G06F 3/01* (2006.01)
(Continued)

(52) U.S. Cl.
CPC ............ *G06F 3/017* (2013.01); *G06K 9/00335* (2013.01); *G06T 7/606* (2013.01); *G06T 2207/10028* (2013.01); *G06T 2207/30196* (2013.01)

(58) Field of Classification Search
CPC ........... G06F 3/01; G06F 3/011; G06F 3/017; G06K 9/00335
USPC ...................... 345/10, 24, 156, 158, 418, 949; 382/103, 169, 237; 463/36
See application file for complete search history.

(56) References Cited

U.S. PATENT DOCUMENTS 4,627,620 A 12/1986 Yang
4,630,910 A 12/1986 Ross et al.
(Continued)

FOREIGN PATENT DOCUMENTS

CN 101254344 B 6/2010
EP 0583061 A2 2/1994
(Continued)

OTHER PUBLICATIONS

International Search Report & Written Opinion mailed Apr. 23, 2014, in PCT Patent Application No. PCT/US2014/016155 filed Feb. 13, 2014, 13 Pages.
(Continued)

*Primary Examiner* — Joe H Cheng
(74) *Attorney, Agent, or Firm* — Bryan Webster; Kate Drakos; Micky Minhas

(57) ABSTRACT

Embodiments described herein use depth images to extract user behavior, wherein each depth image specifies that a plurality of pixels correspond to a user. A depth-based center-of-mass position is determined for the plurality of pixels that correspond to the user. Additionally, a depth-based inertia tensor can also be determined for the plurality of pixels that correspond to the user. In certain embodiments, the plurality of pixels that correspond to the user are divided into quadrants and a depth-based quadrant center-of-mass position is determined for each of the quadrants. Additionally, a depth-based quadrant inertia tensor can be determined for each of the quadrants. Based on one or more of the depth-based center-of-mass position, the depth-based inertial tensor, the depth-based quadrant center-of-mass positions or the depth-based quadrant inertia tensors, an application is updated.

19 Claims, 11 Drawing Sheets

(51) Int. Cl.
  *G06K 9/00* (2006.01)
  *G06T 7/60* (2006.01)

(56) References Cited

U.S. PATENT DOCUMENTS

| | | |
|---|---|---|
| 4,645,458 A | 2/1987 | Williams |
| 4,695,953 A | 9/1987 | Blair et al. |
| 4,702,475 A | 10/1987 | Elstein et al. |
| 4,711,543 A | 12/1987 | Blair et al. |
| 4,751,642 A | 6/1988 | Silva et al. |
| 4,796,997 A | 1/1989 | Svetkoff et al. |
| 4,809,065 A | 2/1989 | Harris et al. |
| 4,817,950 A | 4/1989 | Goo |
| 4,843,568 A | 6/1989 | Krueger et al. |
| 4,893,183 A | 1/1990 | Nayar |
| 4,901,362 A | 2/1990 | Terzian |
| 4,925,189 A | 5/1990 | Braeunig |
| 5,101,444 A | 3/1992 | Wilson et al. |
| 5,148,154 A | 9/1992 | MacKay et al. |
| 5,184,295 A | 2/1993 | Mann |
| 5,229,754 A | 7/1993 | Aoki et al. |
| 5,229,756 A | 7/1993 | Kosugi et al. |
| 5,239,463 A | 8/1993 | Blair et al. |
| 5,239,464 A | 8/1993 | Blair et al. |
| 5,288,078 A | 2/1994 | Capper et al. |
| 5,295,491 A | 3/1994 | Gevins |
| 5,320,538 A | 6/1994 | Baum |
| 5,347,306 A | 9/1994 | Nitta |
| 5,359,704 A | 10/1994 | Rossignac et al. |
| 5,385,519 A | 1/1995 | Hsu et al. |
| 5,405,152 A | 4/1995 | Katanics et al. |
| 5,417,210 A | 5/1995 | Funda et al. |
| 5,423,554 A | 6/1995 | Davis |
| 5,454,043 A | 9/1995 | Freeman |
| 5,469,740 A | 11/1995 | French et al. |
| 5,495,576 A | 2/1996 | Ritchey |
| 5,516,105 A | 5/1996 | Eisenbrey et al. |
| 5,524,637 A | 6/1996 | Erickson et al. |
| 5,534,917 A | 7/1996 | MacDougall |
| 5,563,988 A | 10/1996 | Maes et al. |
| 5,577,981 A | 11/1996 | Jarvik |
| 5,580,249 A | 12/1996 | Jacobsen et al. |
| 5,594,469 A | 1/1997 | Freeman et al. |
| 5,597,309 A | 1/1997 | Riess |
| 5,616,078 A | 4/1997 | Oh |
| 5,617,312 A | 4/1997 | Iura et al. |
| 5,638,300 A | 6/1997 | Johnson |
| 5,641,288 A | 6/1997 | Zaenglein |
| 5,682,196 A | 10/1997 | Freeman |
| 5,682,229 A | 10/1997 | Wangler |
| 5,690,582 A | 11/1997 | Ulrich et al. |
| 5,703,367 A | 12/1997 | Hashimoto et al. |
| 5,704,837 A | 1/1998 | Iwasaki et al. |
| 5,715,834 A | 2/1998 | Bergamasco et al. |
| 5,875,108 A | 2/1999 | Hoffberg et al. |
| 5,877,803 A | 3/1999 | Wee et al. |
| 5,913,727 A | 6/1999 | Ahdoot |
| 5,933,125 A | 8/1999 | Fernie |
| 5,980,256 A | 11/1999 | Carmein |
| 5,989,157 A | 11/1999 | Walton |
| 5,995,649 A | 11/1999 | Marugame |
| 6,005,548 A | 12/1999 | Latypov et al. |
| 6,009,210 A | 12/1999 | Kang |
| 6,054,991 A | 4/2000 | Crane et al. |
| 6,066,075 A | 5/2000 | Poulton |
| 6,072,494 A | 6/2000 | Nguyen |
| 6,073,489 A | 6/2000 | French et al. |
| 6,077,201 A | 6/2000 | Cheng et al. |
| 6,098,458 A | 8/2000 | French et al. |
| 6,100,896 A | 8/2000 | Strohecker et al. |
| 6,101,289 A | 8/2000 | Kellner |
| 6,128,003 A | 10/2000 | Smith et al. |
| 6,130,677 A | 10/2000 | Kunz |
| 6,141,463 A | 10/2000 | Covell et al. |
| 6,147,678 A | 11/2000 | Kumar et al. |
| 6,152,856 A | 11/2000 | Studor et al. |
| 6,159,100 A | 12/2000 | Smith |
| 6,173,066 B1 | 1/2001 | Peurach et al. |
| 6,181,343 B1 | 1/2001 | Lyons |
| 6,188,777 B1 | 2/2001 | Darrell et al. |
| 6,215,890 B1 | 4/2001 | Matsuo et al. |
| 6,215,898 B1 | 4/2001 | Woodfill et al. |
| 6,226,396 B1 | 5/2001 | Marugame |
| 6,229,913 B1 | 5/2001 | Nayar et al. |
| 6,256,033 B1 | 7/2001 | Nguyen |
| 6,256,400 B1 | 7/2001 | Takata et al. |
| 6,283,860 B1 | 9/2001 | Lyons et al. |
| 6,289,112 B1 | 9/2001 | Jain et al. |
| 6,299,308 B1 | 10/2001 | Voronka et al. |
| 6,308,565 B1 | 10/2001 | French et al. |
| 6,316,934 B1 | 11/2001 | Amorai-Moriya et al. |
| 6,363,160 B1 | 3/2002 | Bradski et al. |
| 6,384,819 B1 | 5/2002 | Hunter |
| 6,411,744 B1 | 6/2002 | Edwards |
| 6,430,997 B1 | 8/2002 | French et al. |
| 6,476,834 B1 | 11/2002 | Doval et al. |
| 6,496,598 B1 | 12/2002 | Harman |
| 6,503,195 B1 | 1/2003 | Keller et al. |
| 6,539,931 B2 | 4/2003 | Trajkovic et al. |
| 6,570,555 B1 | 5/2003 | Prevost et al. |
| 6,633,294 B1 | 10/2003 | Rosenthal et al. |
| 6,640,202 B1 | 10/2003 | Dietz et al. |
| 6,661,918 B1 | 12/2003 | Gordon et al. |
| 6,681,031 B2 | 1/2004 | Cohen et al. |
| 6,714,665 B1 | 3/2004 | Hanna et al. |
| 6,731,799 B1 | 5/2004 | Sun et al. |
| 6,738,066 B1 | 5/2004 | Nguyen |
| 6,765,726 B2 | 7/2004 | French et al. |
| 6,788,809 B1 | 9/2004 | Grzeszczuk et al. |
| 6,801,637 B2 | 10/2004 | Voronka et al. |
| 6,873,723 B1 | 3/2005 | Aucsmith et al. |
| 6,876,496 B2 | 4/2005 | French et al. |
| 6,937,742 B2 | 8/2005 | Roberts et al. |
| 6,950,534 B2 | 9/2005 | Cohen et al. |
| 7,003,134 B1 | 2/2006 | Covell et al. |
| 7,036,094 B1 | 4/2006 | Cohen et al. |
| 7,038,855 B2 | 5/2006 | French et al. |
| 7,039,676 B1 | 5/2006 | Day et al. |
| 7,042,440 B2 | 5/2006 | Pryor et al. |
| 7,050,606 B2 | 5/2006 | Paul et al. |
| 7,058,204 B2 | 6/2006 | Hildreth et al. |
| 7,060,957 B2 | 6/2006 | Lange et al. |
| 7,113,918 B1 | 9/2006 | Ahmad et al. |
| 7,121,946 B2 | 10/2006 | Paul et al. |
| 7,170,492 B2 | 1/2007 | Bell |
| 7,184,048 B2 | 2/2007 | Hunter |
| 7,202,898 B1 | 4/2007 | Braun et al. |
| 7,222,078 B2 | 5/2007 | Abelow |
| 7,227,526 B2 | 6/2007 | Hildreth et al. |
| 7,257,237 B1 | 8/2007 | Luck et al. |
| 7,259,747 B2 | 8/2007 | Bell |
| 7,308,112 B2 | 12/2007 | Fujimura et al. |
| 7,315,301 B1 | 1/2008 | Sell |
| 7,317,836 B2 | 1/2008 | Fujimura et al. |
| 7,348,963 B2 | 3/2008 | Bell |
| 7,359,121 B2 | 4/2008 | French et al. |
| 7,367,887 B2 | 5/2008 | Watabe et al. |
| 7,379,563 B2 | 5/2008 | Shamaie |
| 7,379,566 B2 | 5/2008 | Hildreth |
| 7,389,591 B2 | 6/2008 | Jaiswal et al. |
| 7,412,077 B2 | 8/2008 | Li et al. |
| 7,421,093 B2 | 9/2008 | Hildreth et al. |
| 7,430,312 B2 | 9/2008 | Gu |
| 7,436,496 B2 | 10/2008 | Kawahito |
| 7,450,736 B2 | 11/2008 | Yang et al. |
| 7,452,275 B2 | 11/2008 | Kuraishi |
| 7,460,690 B2 | 12/2008 | Cohen et al. |
| 7,489,812 B2 | 2/2009 | Fox et al. |
| 7,536,032 B2 | 5/2009 | Bell |
| 7,555,142 B2 | 6/2009 | Hildreth et al. |
| 7,560,701 B2 | 7/2009 | Oggier et al. |
| 7,570,805 B2 | 8/2009 | Gu |
| 7,574,020 B2 | 8/2009 | Shamaie |
| 7,576,727 B2 | 8/2009 | Bell |

(56) References Cited

U.S. PATENT DOCUMENTS

| | | | |
|---|---|---|---|
| 7,590,262 B2 | 9/2009 | Fujimura et al. | |
| 7,593,552 B2 | 9/2009 | Higaki et al. | |
| 7,598,942 B2 | 10/2009 | Underkoffler et al. | |
| 7,607,509 B2 | 10/2009 | Schmiz et al. | |
| 7,620,202 B2 | 11/2009 | Fujimura et al. | |
| 7,668,340 B2 | 2/2010 | Cohen et al. | |
| 7,680,298 B2 | 3/2010 | Roberts et al. | |
| 7,683,954 B2 | 3/2010 | Ichikawa et al. | |
| 7,684,592 B2 | 3/2010 | Paul et al. | |
| 7,701,439 B2 | 4/2010 | Hillis et al. | |
| 7,702,130 B2 | 4/2010 | Im et al. | |
| 7,704,135 B2 | 4/2010 | Harrison, Jr. | |
| 7,710,391 B2 | 5/2010 | Bell et al. | |
| 7,729,530 B2 | 6/2010 | Antonov et al. | |
| 7,746,345 B2 | 6/2010 | Hunter | |
| 7,760,182 B2 | 7/2010 | Ahmad et al. | |
| 7,809,167 B2 | 10/2010 | Bell | |
| 7,834,846 B1 | 11/2010 | Bell | |
| 7,852,262 B2 | 12/2010 | Namineni et al. | |
| RE42,256 E | 3/2011 | Edwards | |
| 7,898,522 B2 | 3/2011 | Hildreth et al. | |
| 7,961,910 B2* | 6/2011 | Lee et al. | 382/103 |
| 8,035,612 B2 | 10/2011 | Bell et al. | |
| 8,035,614 B2 | 10/2011 | Bell et al. | |
| 8,035,624 B2 | 10/2011 | Bell et al. | |
| 8,072,470 B2 | 12/2011 | Marks | |
| 8,284,258 B1 | 10/2012 | Cetin et al. | |
| 8,340,432 B2 | 12/2012 | Mathe et al. | |
| 8,503,766 B2* | 8/2013 | Mathe et al. | 382/154 |
| 8,660,362 B2* | 2/2014 | Katz et al. | 382/199 |
| 8,797,386 B2* | 8/2014 | Chou et al. | 348/46 |
| 8,818,028 B2* | 8/2014 | Nguyen et al. | 382/103 |
| 2003/0043270 A1 | 3/2003 | Rafey et al. | |
| 2005/0031166 A1* | 2/2005 | Fujimura et al. | 382/103 |
| 2007/0285419 A1* | 12/2007 | Givon | 345/420 |
| 2008/0026838 A1 | 1/2008 | Dunstan et al. | |
| 2008/0037829 A1* | 2/2008 | Givon | 382/107 |
| 2009/0221368 A1* | 9/2009 | Yen et al. | 463/32 |
| 2009/0265671 A1 | 10/2009 | Sachs et al. | |
| 2009/0298650 A1 | 12/2009 | Kutliroff | |
| 2010/0034457 A1* | 2/2010 | Berliner et al. | 382/154 |
| 2010/0235786 A1* | 9/2010 | Maizels et al. | 715/810 |
| 2010/0302395 A1 | 12/2010 | Mathe et al. | |
| 2010/0303302 A1* | 12/2010 | Kipman et al. | 382/107 |
| 2012/0056982 A1 | 3/2012 | Katz et al. | |
| 2012/0139918 A1 | 6/2012 | Michail et al. | |
| 2012/0159290 A1 | 6/2012 | Pulsipher et al. | |
| 2012/0195471 A1 | 8/2012 | Newcombe et al. | |
| 2012/0214594 A1 | 8/2012 | Kirovski et al. | |
| 2012/0242789 A1 | 9/2012 | Cheng et al. | |
| 2012/0307010 A1 | 12/2012 | Evertt et al. | |
| 2012/0308116 A1* | 12/2012 | Eichorn | 382/154 |
| 2012/0308140 A1 | 12/2012 | Ambrus et al. | |
| 2012/0309532 A1 | 12/2012 | Ambrus et al. | |
| 2012/0326976 A1 | 12/2012 | Markovic et al. | |
| 2013/0016879 A1* | 1/2013 | Baele et al. | 382/103 |
| 2013/0063556 A1* | 3/2013 | Russell et al. | 348/42 |
| 2014/0118335 A1* | 5/2014 | Gurman | 345/419 |
| 2014/0254867 A1* | 9/2014 | Hoof et al. | 382/103 |

FOREIGN PATENT DOCUMENTS

| | | |
|---|---|---|
| JP | 08044490 A1 | 2/1996 |
| WO | 93/10708 A1 | 6/1993 |
| WO | 97/17598 A1 | 5/1997 |
| WO | 99/44698 A1 | 9/1999 |
| WO | 2012/120521 A1 | 9/2012 |

OTHER PUBLICATIONS

Betge-Brezetz, et al., "Natural Scene Understanding for Mobile Robot Navigation", In IEEE International Conference on Robotics and Automation, May 8, 1994, pp. 730-736.

Brunner, Simon, "Using Microsoft Kinect Sensor to Perform Commands on Virtual Objects", Published on: Oct. 2, 2012, Available at: https://diuf.unifr.ch/main/diva/sites/diuf.unifr.ch.main.diva/files/Thesis%20paper.pdf.

Brubaker, Marcus A., "Physical Models of Human Motion for Estimation and Scene Analysis", In PhD. Thesis Submitted in Conformity with the Requirements for the Degree of Doctor of Philosophy, Graduate Department of Computer Science, University of Toronto, Jan. 5, 2012, 169 pages.

Gonzalez, et al., "Estimation of the Center of Mass with Kinect and Wii Balance Board", In Proceedings of IEEE/RSJ International Conference on Intelligent Robot and Systems, Oct. 7, 2012, 6 pages.

Sinthanayothin, et al., "Skeleton Tracking using Kinect Sensor & Displaying in 3D Virtual Scene", In International Journal of Advancements in Computing Technology, vol. 4, Issue 11, Jun. 2012, 11 pages.

Camplani, et al., "Efficient Spatio-Temporal Hole Filling Strategy for Kinect Depth Maps", In Proceedings of Three Dimensional Image Processing & Applications II, Feb. 9, 2012, 10 pages.

Gaidon, et al., "A Time Series Kernel for Action Recognition", In Proceedings of the British Machine Vision Conference, Sep. 2011, 11 pages.

Lien, et al., "Skeleton-Based Data Compression for Multi-Camera Tele-Immersion System", In Advances in Visual Computing, Third International Symposium, Nov. 26, 2007, 10 pages.

Ye, et al., "Accurate 3D Pose Estimation from a Single Depth Image", In IEEE International Conference on Computer Vision, Nov. 6, 2011, 8 pages.

Obdrzalek, et al., "Accuracy and Robustness of Kinect Pose Estimation in the Context of Coaching of Elderly Population", In Annual International Conference of the IEEE Engineering in Medicine and Biology Society, Aug. 28, 2012, 6 pages.

Manasrah, Ahmad Adli, "Human Motion Tracking for Assisting Balance Training and Control of a Humanoid Robot", In PhD. Thesis Submitted in Partial Fulfilment of the Requirements for the Degree of Master of Science in Mechanical Engineering, Department of Mechanical Engineering, University of South Florida, Jan. 1, 2012, 82 pages.

Strauss, Ben, "Kinect Can 'Sort of' Handle Players Lying Down", Published on: Jul. 14, 2010, Available at: http://www.industrygamers.com/news/kinect-can-sort-of-handle-players-lying-down/.

Brubaker, Marcus, "Physics-Based Priors for Human Pose Tracking", In a Thesis Submitted in Conformity with the Requirements for the Degree of Master of Science, Graduate Department of Computer Science, University of Toronto, Mar. 11, 2013, 89 pages.

Poulios, Nikolaos, "Sensor Based Physical Interaction for Embodied Playful Learning Games", In Master Thesis Project, Jul. 2012, 81 pages.

Yu, et al., "Automatic Human Body Tracking and Modeling from Monocular Video Sequences", In IEEE International Conference on Acoustics, Speech and Signal Processing, Apr. 15, 2007, 4 pages.

Isenberg, et al., "Stylizing Silhouettes at Interactive Rates: From Silhouette Edges to Silhouette Strokes", In Journal of Computer Graphics Forum, vol. 21, Issue 3, Sep. 2002, 10 pages.

"1 Kinect Depth Inpainting and Filtering", Retrieved on: Dec. 3, 2013, Available at: http://www.radfordparker.com/papers/kinectinpainting.pdf.

Raskar, et al., "Image Precision Silhouette Edges", In Proceedings of the Symposium on Interactive 3D Graphics, Apr. 26, 1999, 7 pages.

Catto, et al., "Iterative Dynamics with Temporal Coherence", Feb. 22, 2005, Menlo Park, California, 24 pages.

Solh et al., "Hierarchical Hole-Filling for Depth-based View Synthesis in FTV and 3D Video", Draft, IEEE Journal of Selected Topics in Signal Processing, Jun. 2012.

Written Opinion of the International Preliminary Examining Authority mailed Aug. 1, 2014, in PCT Patent Application No. PCT/US2014/016155 filed Feb. 13, 2014, 13 Pages.

Kanade et al., "A Stereo Machine for Video-rate Dense Depth Mapping and Its New Applications", IEEE Computer Society Conference on Computer Vision and Pattern Recognition, 1996, pp. 196-202, The Robotics Institute, Carnegie Mellon University, Pittsburgh, PA.

Miyagawa et al., "CCD-Based Range Finding Sensor", Oct. 1997, pp. 1648-1652, vol. 44 No. 10, IEEE Transactions on Electron Devices.

(56) References Cited

OTHER PUBLICATIONS

Rosenhahn et al., "Automatic Human Model Generation", 2005, pp. 41-48, University of Auckland (CITR), New Zealand.

Aggarwal et al., "Human Motion Analysis: A Review", IEEE Nonrigid and Articulated Motion Workshop, 1997, University of Texas at Austin, Austin, TX.

Shao et al., "An Open System Architecture for a Multimedia and Multimodal User Interface", Aug. 24, 1998, Japanese Society for Rehabilitation of Persons with Disabilities (JSRPD), Japan.

Kohler, "Special Topics of Gesture Recognition Applied in Intelligent Home Environments", In Proceedings of the Gesture Workshop, 1998, pp. 285-296, Germany.

Kohler, "Vision Based Remote Control in Intelligent Home Environments", University of Erlangen-Nuremberg/Germany, 1996, pp. 147-154, Germany.

Kohler, "Technical Details and Ergonomical Aspects of Gesture Recognition applied in Intelligent Home Environments", 1997, Germany.

Hasegawa et al., "Human-Scale Haptic Interaction with a Reactive Virtual Human in a Real-Time Physics Simulator", Jul. 2006, vol. 4, No. 3, Article 6C, ACM Computers in Entertainment, New York, NY.

Qian et al., "A Gesture-Driven Multimodal Interactive Dance System", Jun. 2004, pp. 1579-1582, IEEE International Conference on Multimedia and Expo (ICME), Taipei, Taiwan.

Zhao, "Dressed Human Modeling, Detection, and Parts Localization", 2001, The Robotics Institute, Carnegie Mellon University, Pittsburgh, PA.

He, "Generation of Human Body Models", Apr. 2005, University of Auckland, New Zealand.

Isard et al., "Condensation—Conditional Density Propagation for Visual Tracking", 1998, pp. 5-28, International Journal of Computer Vision 29(1), Netherlands.

Livingston, "Vision-based Tracking with Dynamic Structured Light for Video See-through Augmented Reality", 1998, University of North Carolina at Chapel Hill, North Carolina, USA.

Wren et al., "Pfinder: Real-Time Tracking of the Human Body", MIT Media Laboratory Perceptual Computing Section Technical Report No. 353, Jul. 1997, vol. 19, No. 7, pp. 780-785, IEEE Transactions on Pattern Analysis and Machine Intelligence, Caimbridge, MA.

Breen et al., "Interactive Occlusion and Collision of Real and Virtual Objects in Augmented Reality", Technical Report ECRC-95-02, 1995, European Computer-Industry Research Center GmbH, Munich, Germany.

Freeman et al., "Television Control by Hand Gestures", Dec. 1994, Mitsubishi Electric Research Laboratories, TR94-24, Caimbridge, MA.

Hongo et al., "Focus of Attention for Face and Hand Gesture Recognition Using Multiple Cameras", Mar. 2000, pp. 156-161, 4th IEEE International Conference on Automatic Face and Gesture Recognition, Grenoble, France.

Pavlovic et al., "Visual Interpretation of Hand Gestures for Human-Computer Interaction: A Review", Jul. 1997, pp. 677-695, vol. 19, No. 7, IEEE Transactions on Pattern Analysis and Machine Intelligence.

Azarbayejani et al., "Visually Controlled Graphics", Jun. 1993, vol. 15, No. 6, IEEE Transactions on Pattern Analysis and Machine Intelligence.

Granieri et al., "Simulating Humans in VR", The British Computer Society, Oct. 1994, Academic Press.

Brogan et al., "Dynamically Simulated Characters in Virtual Environments", Sep./Oct. 1998, pp. 2-13, vol. 18, Issue 5, IEEE Computer Graphics and Applications.

Fisher et al., "Virtual Environment Display System", ACM Workshop on Interactive 3D Graphics, Oct. 1986, Chapel Hill, NC.

"Virtual High Anxiety", Tech Update, Aug. 1995, pp. 22.

Sheridan et al., "Virtual Reality Check", Technology Review, Oct. 1993, pp. 22-28, vol. 96, No. 7.

Stevens, "Flights into Virtual Reality Treating Real World Disorders", The Washington Post, Mar. 27, 1995, Science Psychology, 2 pages.

"Simulation and Training", 1994, Division Incorporated.

English Machine-translation of Japanese Publication No. JP08-044490 published on Feb. 16, 1996.

Amendment dated Nov. 4, 2014, in PCT Patent Application No. PCT/US2014/016155 filed Feb. 13, 2014.

International Preliminary Report mailed Nov. 12, 2014, in PCT Patent Application No. PCT/US2014/016155 filed Feb. 13, 2014.

\* cited by examiner

| 30 | 15 | 15 | 15 | 16 | 16 | 16 | 18 | 18 | 18 | 18 | 18 | 18 | 20 | 20 | 20 | 20 | 20 | 20 | 20 | 20 | 20 | 30 | 30 |
|----|----|----|----|----|----|----|----|----|----|----|----|----|----|----|----|----|----|----|----|----|----|----|----|
| 30 | 15 | 15 | 15 | 16 | 16 | 16 | 18 | 18 | 18 | 18 | 18 | 18 | 20 | 20 | 20 | 20 | 20 | 20 | 20 | 20 | 20 | 30 | 30 |
| 30 | 15 | 15 | 15 | 16 | 16 | 16 | 18 | 18 | 18 | 18 | 18 | 18 | 20 | 20 | 20 | 20 | 20 | 20 | 20 | 20 | 20 | 30 | 30 |
| 30 | 15 | 15 | 15 | 16 | 16 | 16 | 18 | 18 | 18 | 18 | 18 | 18 | 9 | 20 | 20 | 19 | 19 | 20 | 20 | 20 | 20 | 30 | 30 |
| 30 | 15 | 15 | 15 | 16 | 16 | 16 | 18 | 8 | 8 | 9 | 9 | 9 | 9 | 9 | 9 | 9 | 19 | 19 | 20 | 20 | 20 | 30 | 30 |
| 30 | 15 | 15 | 15 | 16 | 16 | 16 | 8 | 8 | 7 | 8 | 8 | 8 | 8 | 8 | 8 | 9 | 9 | 9 | 19 | 20 | 20 | 30 | 30 |
| 30 | 15 | 15 | 16 | 16 | 16 | 8 | 7 | 7 | 6 | 7 | 7 | 7 | 7 | 7 | 7 | 8 | 8 | 9 | 9 | 9 | 20 | 30 | 30 |
| 30 | 15 | 15 | 16 | 16 | 8 | 8 | 6 | 6 | 5 | 5 | 5 | 5 | 6 | 7 | 7 | 7 | 8 | 8 | 9 | 19 | 20 | 30 | 30 |
| 30 | 15 | 15 | 16 | 7 | 7 | 7 | 6 | 5 | 5 | 5 | 5 | 5 | 5 | 7 | 6 | 7 | 8 | 8 | 9 | 19 | 20 | 30 | 30 |
| 30 | 15 | 15 | 16 | 7 | 7 | 7 | 5 | 5 | 5 | 5 | 5 | 5 | 5 | 5 | 6 | 7 | 8 | 8 | 9 | 9 | 19 | 30 | 30 |
| 30 | 15 | 15 | 16 | 7 | 7 | 6 | 5 | 5 | 5 | 5 | 5 | 5 | 5 | 6 | 7 | 8 | 8 | 9 | 9 | 19 | 30 | 30 | |
| 30 | 15 | 15 | 7 | 7 | 6 | 6 | 5 | 5 | 5 | 5 | 5 | 5 | 5 | 6 | 7 | 8 | 8 | 9 | 19 | 19 | 30 | 30 | |
| 30 | 15 | 15 | 6 | 6 | 5 | 6 | 5 | 5 | 5 | 4 | 4 | 5 | 4 | 4 | 6 | 7 | 8 | 8 | 9 | 19 | 20 | 30 | 30 |
| 30 | 15 | 15 | 5 | 6 | 5 | 3 | 5 | 5 | 5 | 5 | 5 | 5 | 5 | 5 | 6 | 7 | 8 | 9 | 19 | 20 | 30 | 30 | |
| 30 | 15 | 15 | 4 | 5 | 4 | 4 | 5 | 5 | 5 | 5 | 5 | 5 | 5 | 5 | 6 | 7 | 8 | 9 | 19 | 19 | 30 | 30 | |
| 30 | 15 | 15 | 5 | 5 | 5 | 5 | 5 | 5 | 5 | 5 | 5 | 5 | 5 | 5 | 6 | 7 | 8 | 18 | 18 | 19 | 30 | 30 | |
| 30 | 15 | 15 | 15 | 5 | 4 | 5 | 5 | 5 | 5 | 5 | 5 | 5 | 5 | 5 | 6 | 7 | 8 | 18 | 18 | 18 | 30 | 30 | |
| 30 | 15 | 15 | 15 | 5 | 5 | 5 | 5 | 5 | 5 | 5 | 5 | 5 | 5 | 5 | 6 | 7 | 8 | 18 | 18 | 18 | 30 | 30 | |
| 30 | 15 | 15 | 15 | 15 | 5 | 5 | 5 | 5 | 5 | 5 | 5 | 5 | 5 | 5 | 6 | 7 | 8 | 18 | 18 | 18 | 30 | 30 | |
| 30 | 15 | 15 | 15 | 15 | 15 | 5 | 5 | 5 | 5 | 5 | 5 | 5 | 5 | 6 | 6 | 7 | 8 | 18 | 18 | 18 | 30 | 30 | |
| 30 | 15 | 15 | 15 | 15 | 15 | 5 | 5 | 5 | 5 | 5 | 5 | 5 | 5 | 6 | 7 | 8 | 18 | 18 | 18 | 18 | 30 | 30 | |
| 30 | 15 | 15 | 15 | 15 | 15 | 5 | 5 | 5 | 5 | 5 | 5 | 5 | 6 | 7 | 7 | 18 | 18 | 18 | 18 | 18 | 30 | 30 | |
| 30 | 15 | 15 | 15 | 15 | 15 | 5 | 5 | 5 | 5 | 5 | 5 | 6 | 6 | 7 | 7 | 18 | 18 | 18 | 18 | 30 | 30 | | |
| 30 | 15 | 15 | 15 | 15 | 15 | 5 | 5 | 5 | 5 | 5 | 5 | 6 | 6 | 7 | 7 | 18 | 18 | 18 | 18 | 18 | 30 | 30 | |

FIG. 6

USER CENTER-OF-MASS AND MASS DISTRIBUTION EXTRACTION USING DEPTH IMAGES

BACKGROUND

Many computing applications such as computer games, multimedia applications, or the like use controls to allow users to manipulate game characters or other aspects of an application. Conventionally, such controls are input using, for example, controllers, remotes, keyboards, mice, or the like. Unfortunately, such controls can be difficult to learn, thus creating a barrier between a user and such games and applications. Furthermore, such controls may be different than actual game actions or other application actions for which the controls are used. For example, a game control that causes a game character to swing a baseball bat may not correspond to an actual motion of swinging the baseball bat. Recently, cameras have been used to allow users to manipulate game characters or other aspects of an application without the need for conventional handheld game controllers. More specifically, computing systems have been adapted to identify users captured by cameras, and to detect motion or other behaviors of the users. Typically, such computing systems have relied on skeletal tracking (ST) techniques to detect motion or other user behaviors. However, while useful for detecting certain types of user behaviors, ST techniques have proven to be unreliable for detecting other types of user behaviors. For example, ST techniques are typically unreliable for detecting user behaviors where the user is laying or sitting on or near the floor.

SUMMARY

Disclosed herein are systems and methods for extracting user behavior from depth images. Such systems and methods can be used in place of, or to supplement, skeletal tracking (ST) techniques that are often used to detect user behaviors such as user motion.

In accordance with an embodiment, each depth image, which is obtained using a capture device e.g., a camera) located a distance from the user, specifies that a plurality of pixels of the depth image correspond to a user. Additionally, each depth image specifies, for each of the pixels corresponding to the user, a pixel location and a pixel depth, where the pixel depth is indicative of a distance between the capture device and a portion of the user represented by the pixel. Based on the depth images, information indicative of user behavior is extracted, and such information is used to update an application.

In an embodiment, a depth-based center-of-mass position is determined for a plurality of pixels corresponding to a user. This can be accomplished by determining, for each of the pixels corresponding to the user, a pixel mass that accounts for a distance between the portion of the user represented by the pixel and the capture device used to obtain the depth image. Then, based on the determined pixel masses, the depth-based center-of-mass position is determined in a manner that accounts for distances between the portions of the user represented by the pixels and the capture device used to obtain the depth image. Without this accounting for distances, if a user's hand was held near the capture device, from the perspective of the capture device the user's hand may have a visible area that is as large as or larger than the rest of the user's body. This could result in an inaccurate center-of-mass position. Based on the depth-based center-of mass position, information indicative of a position of a user can be determined. Additionally, by tracking changes in the depth-based center-of-mass position over multiple depth images, changes in a position of the user can be detected, and used to update an application.

In an embodiment, the determined depth-based center-of-mass position is used to divide the plurality of pixels corresponding to the user into quadrants. Then, a separate depth-based quadrant center-of-mass position is determined for each of the quadrants, and the depth-based quadrant center-of-mass positions can be used to determine the positions of different user body parts. By tracking changes in the depth-based quadrant center-of-mass positions over multiple depth images, movements of different user body parts can be detected, and used to update an application.

In an embodiment, a depth-based inertia tensor is also determined for the plurality of pixels corresponding to the user. Additionally, the depth-based inertia tensor can be scaled using an assumption that pixels corresponding to the user has a predetermined mass (e.g., 75 kg). Based on the depth-based inertia tensor, information indicative of the mass distribution of a user can be determined. Additionally, by tracking changes in the depth-based inertia tensor over multiple depth images, changes in the mass distribution of the user can be detected, and used to update an application. In an embodiment where the plurality of pixels corresponding to the user are divided into quadrants, a separate depth-based quadrant inertia tensor can be determined for each of the quadrants, and can be used to update an application.

In an embodiment, an application receives information indicative of the depth-based center-of-mass position, the depth-based inertia tensor, the depth-based quadrant center-of-mass positions and/or the depth-based quadrant inertia tensors, and the application is updated based on such information. For example, such information can be used to track a user performing certain exercises, such as squats, lunges, push-ups, jumps, or jumping jacks so that an avatar of the user can be controlled, points can be awarded to the user and/or feedback can be provided to the user. Where the application is a game that instructs a user to perform certain exercises, the application can determine whether a user has performed an exercise with correct form, and where they have not, can provide feedback to the user regarding how the user can improve their form.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure.

BRIEF DESCRIPTION OF THE DRAWINGS

FIG. 6 depicts exemplary data in an exemplary depth image.

DETAILED DESCRIPTION

Embodiments described herein use depth images to extract user behavior, wherein each depth image specifies that a plurality of pixels correspond to a user. A depth-based center-of-mass position is determined for the plurality of pixels that correspond to the user. Additionally, a depth-based inertia tensor can also be determined for the plurality of pixels that correspond to the user. In certain embodiments, the plurality of pixels that correspond to the user are divided into quadrants and a depth-based quadrant center-of-mass position is determined for each of the quadrants. Additionally, a depth-based quadrant inertia tensor can be determined for each of the quadrants. Based on one or more of the depth-based center-of-mass position, the depth-based inertial tensor, the depth-based quadrant center-of-mass positions or the depth-based quadrant inertia tensors, an application is updated.

Figure 1A:
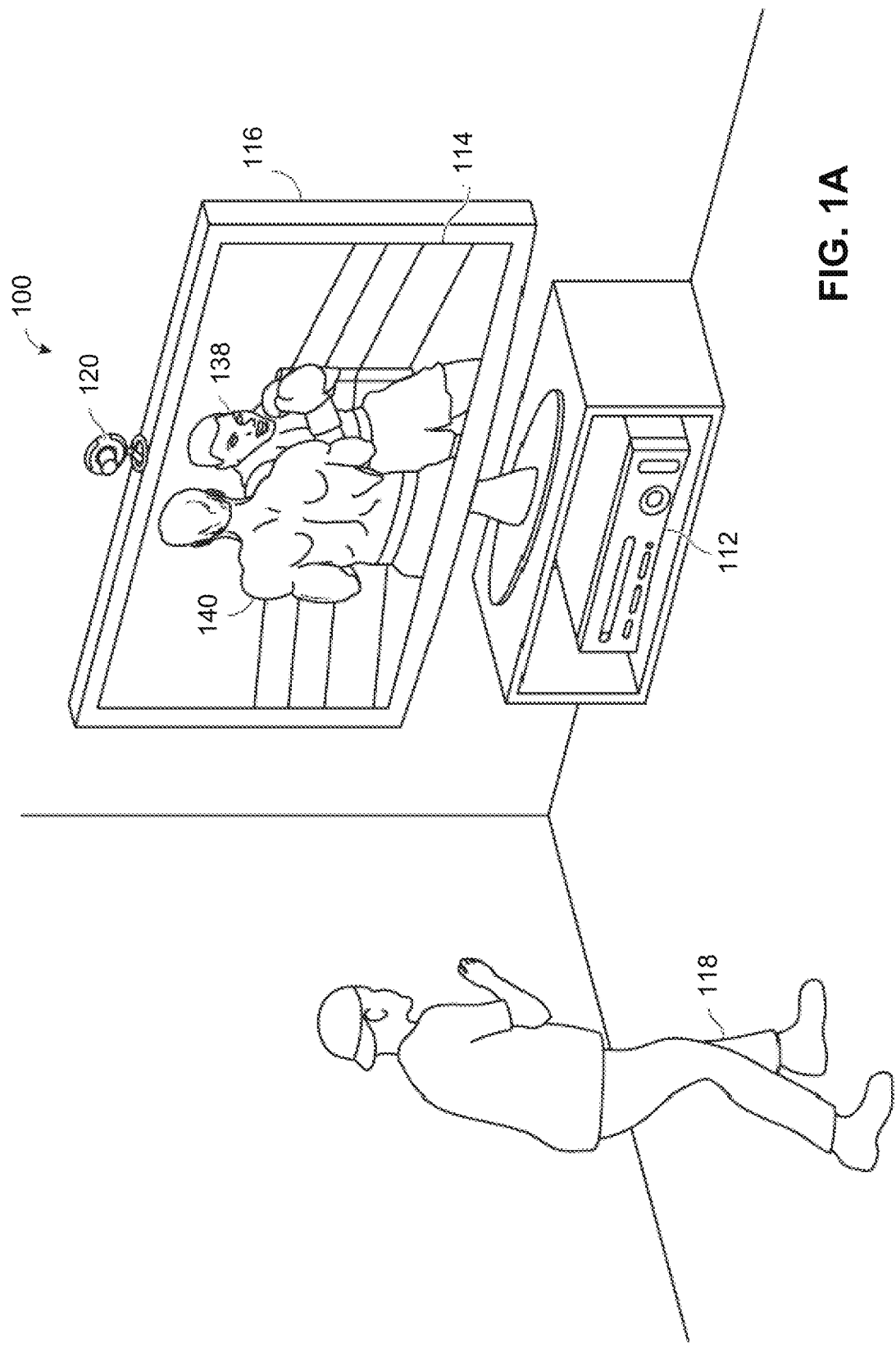
FIGS. 1A and 1B illustrate an example embodiment of a tracking system with a user playing a game.
Figure 1B:
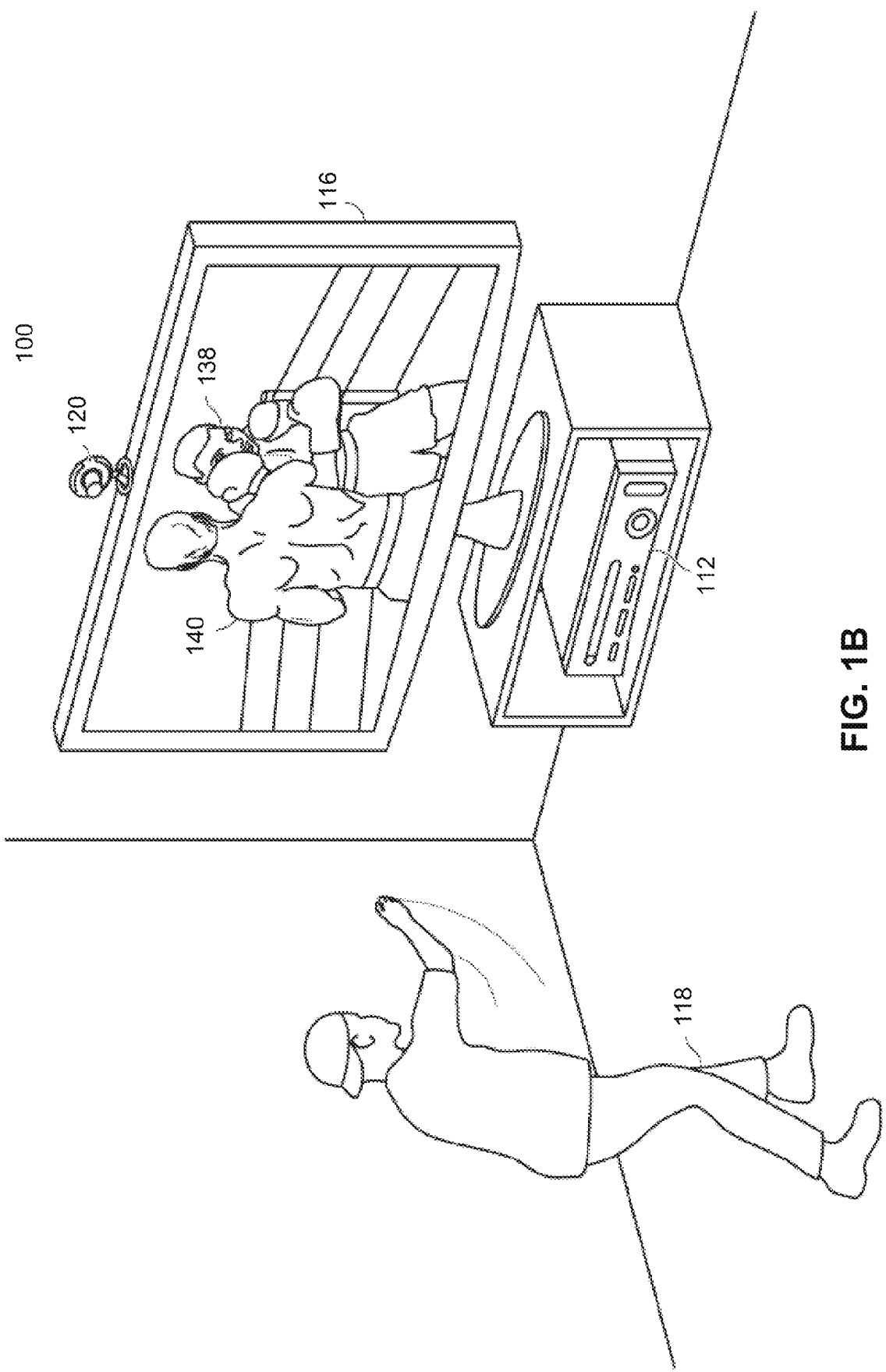

FIGS. 1A and 1B illustrate an example embodiment of a tracking system 100 with a user 118 playing a boxing video game. In an example embodiment, the tracking system 100 may be used to recognize, analyze, and/or track a human target such as the user 118 or other objects within range of the tracking system 100. As shown in FIG. 1A, the tracking system 100 includes a computing system 112 and a capture device 120. As will be describe in additional detail below, the capture device 120 can be used to obtain depth images and color images (also known as RGB images) that can be used by the computing system 112 to identify one or more users or other objects, as well as to track motion and/or other user behaviors. The tracked motion and/or other user behavior can be used to update an application. Therefore, a user can manipulate game characters or other aspects of the application by using movement of the user's body and/or objects around the user, rather than (or in addition to) using controllers, remotes, keyboards, mice, or the like. For example, a video game system can update the position of images displayed in a video game based on the new positions of the objects or update an avatar based on motion of the user.

The computing system 112 may be a computer, a gaining system or console, or the like. According to an example embodiment, the computing system 112 may include hardware components and/or software components such that computing system 112 may be used to execute applications such as gaming applications, non-gaming applications, or the like. In one embodiment, computing system 112 may include a processor such as a standardized processor, a specialized processor, a microprocessor, or the like that may execute instructions stored on a processor readable storage device for performing the processes described herein.

The capture device 120 may be, for example, a camera that may be used to visually monitor one or more users, such as the user 118, such that gestures and/or movements performed by the one or more users may be captured, analyzed, and tracked to perform one or more controls or actions within the application and/or animate an avatar or on-screen character, as will be described in more detail below.

According to one embodiment, the tracking system 100 may be connected to an audiovisual device 116 including a display 114 such as a television, a monitor, a high-definition television (HDTV), or the like that may provide game or application visuals and/or audio to a user such as the user 118. For example, the computing system 112 may include a video adapter such as a graphics card and/or an audio adapter such as a sound card that may provide audiovisual signals associated with the game application, non-game application, or the like. The audiovisual device 116 may receive the audiovisual signals from the computing system 112 and may then output the game or application visuals and/or audio associated with the audiovisual signals to the user 118. According to one embodiment, the audiovisual device 16 may be connected to the computing system 112 via, for example, an S-Video cable, a coaxial cable, an HDMI cable, a DVI cable, a VGA cable, component video cable, or the like.

As shown in FIGS. 1A and 1B, the tracking system 100 may be used to recognize, analyze, and/or track a human target such as the user 118. For example, the user 118 may be tracked using the capture device 120 such that the gestures and/or movements of user 118 may be captured to animate an avatar or on-screen character and/or may be interpreted as controls that may be used to affect the application being executed by computing system 112. Thus, according to one embodiment, the user 118 may move his or her body to control the application and/or animate the avatar or on-screen character.

In the example depicted in FIGS. 1A and 1B, the application executing on the computing system 112 may be a boxing game that the user 118 is playing. For example, the computing system 112 may use the audiovisual device 116 to provide a visual representation of a boxing opponent 138 to the user 118. The computing system 112 may also use the audiovisual device 116 to provide a visual representation of a player avatar 140 that the user 118 may control with his or her movements. For example, as shown in FIG. 1B, the user 118 may throw a punch in physical space to cause the player avatar 140 to throw a punch in game space. Thus, according to an example embodiment, the computer system 112 and the capture device 120 recognize and analyze the punch of the user 118 in physical space such that the punch may be interpreted as a game control of the player avatar 140 in game space and/or the motion of the punch may be used to animate the player avatar 140 in game space.

Other movements by the user 118 may also be interpreted as other controls or actions and/or used to animate the player avatar, such as controls to bob, weave, shuffle, block, jab, or throw a variety of different power punches. Furthermore, some movements may be interpreted as controls that may correspond to actions other than controlling the player avatar 140. For example, in one embodiment, the player may use movements to end, pause, or save a game, select a level, view high scores, communicate with a friend, etc. According to another embodiment, the player may use movements to select the game or other application from a main user interface. Thus, in example embodiments, a full range of motion of the user 118 may be available, used, and analyzed in any suitable manner to interact with an application.

In example embodiments, the human target such as the user 118 may have an object. In such embodiments, the user of an electronic game may be holding the object such that the motions of the player and the object may be used to adjust and/or control parameters of the game. For example, the motion of a player holding a racket may be tracked and utilized for controlling an on-screen racket in an electronic sports game. In another example embodiment, the motion of a player holding an object may be tracked and utilized for controlling an on-screen weapon in an electronic combat game. Objects not held by the user can also be tracked, such as objects thrown, pushed or rolled by the user (or a different user) as well as self-propelled objects. In addition to boxing, other games can also be implemented.

According to other example embodiments, the tracking system 100 may further be used to interpret target movements as operating system and/or application controls that are outside the realm of games. For example, virtually any controllable aspect of an operating system and/or application may be controlled by movements of the target such as the user 118.

Figure 2A:
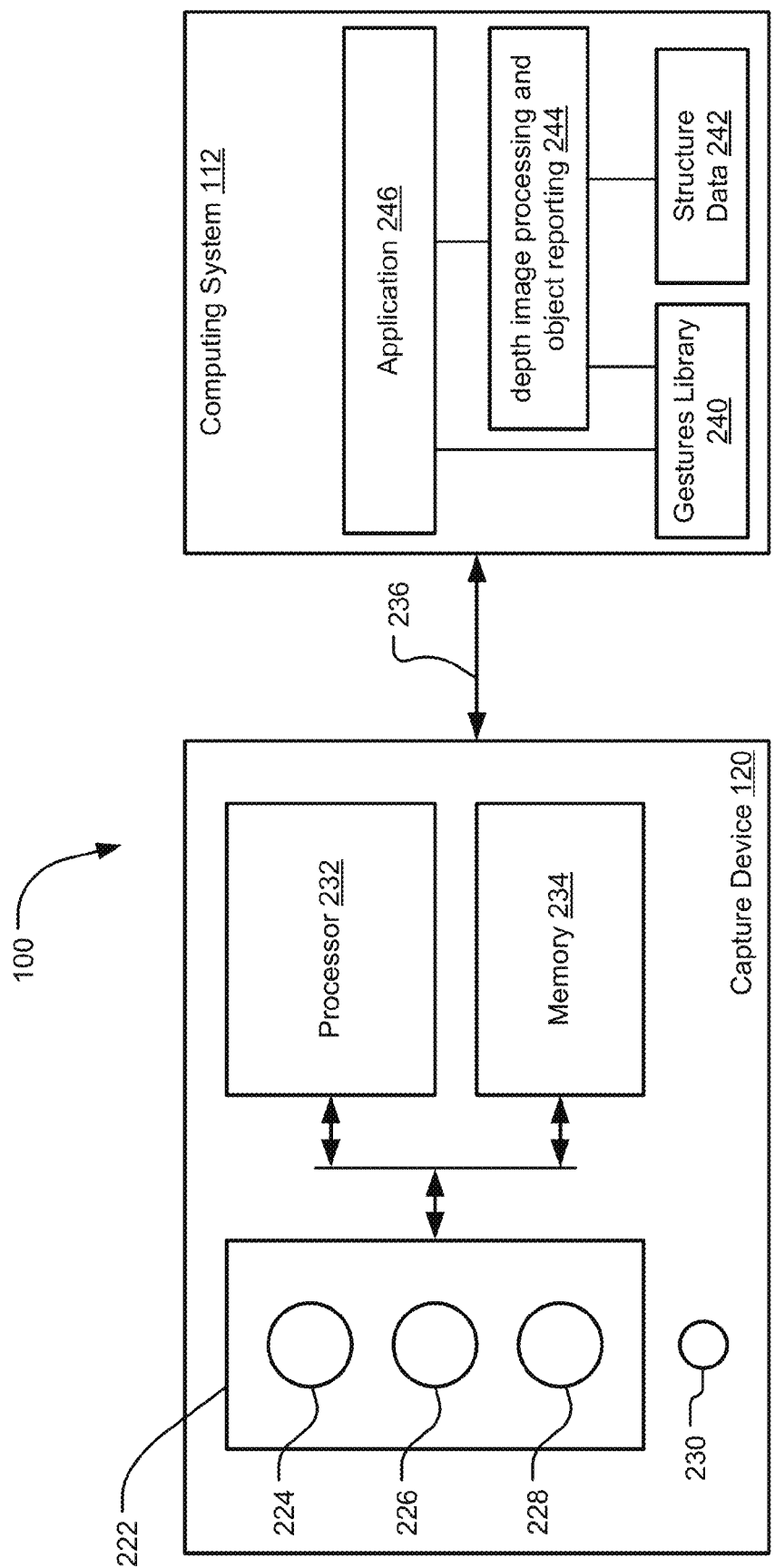
FIG. 2A illustrates an example embodiment of a capture device that may be used as part of the tracking system.

FIG. 2A illustrates an example embodiment of the capture device 120 that may be used in the tracking system 100. According to an example embodiment, the capture device 120 may be configured to capture video with depth information including a depth image that may include depth values via any suitable technique including, for example, time-of-flight, structured light, stereo image, or the like. According to one embodiment, the capture device 120 may organize the depth information into "Z layers," or layers that may be perpendicular to a Z axis extending from the depth camera along its line of sight.

As shown in FIG. 2A, the capture device 120 may include an image camera component 222. According to an example embodiment, the image camera component 222 may be a depth camera that may capture a depth image of a scene. The depth image may include a two-dimensional (2-D) pixel area of the captured scene where each pixel in the 2-D pixel area may represent a depth value such as a distance in, for example, centimeters, millimeters, or the like of an object in the captured scene from the camera.

As shown in FIG. 2A, according to an example embodiment, the image camera component 222 may include an infrared (IR) light component 224, a three-dimensional (3-D) camera 226, and an RGB camera 228 that may be used to capture the depth image of a scene. For example, in time-of-flight analysis, the IR light component 224 of the capture device 120 may emit an infrared light onto the scene and may then use sensors (not shown) to detect the backscattered light from the surface of one or more targets and objects in the scene using, for example, the 3-D camera 226 and/or the RGB camera 228. In some embodiments, pulsed infrared light may be used such that the time between an outgoing light pulse and a corresponding incoming light pulse may be measured and used to determine a physical distance from the capture device 120 to a particular location on the targets or objects in the scene. Additionally, in other example embodiments, the phase of the outgoing light wave may be compared to the phase of the incoming light wave to determine a phase shift. The phase shift may then be used to determine a physical distance from the capture device to a particular location on the targets or objects.

According to another example embodiment, time-of-flight analysis may be used to indirectly determine a physical distance from the capture device 120 to a particular location on the targets or objects by analyzing the intensity of the reflected beam of light over time via various techniques including, for example, shuttered light pulse imaging.

In another example embodiment, the capture device 120 may use a structured light to capture depth information. In such an analysis, patterned light (i.e., light displayed as a known pattern such as grid pattern, a stripe pattern, or different pattern) may be projected onto the scene via, for example, the IR light component 224. Upon striking the surface of one or more targets or objects in the scene, the pattern may become deformed in response. Such a deformation of the pattern may be captured by, for example, the 3-D camera 226 and/or the RGB camera 228 and may then be analyzed to determine a physical distance from the capture device to a particular location on the targets or objects. In some implementations, the IR Light component 224 is displaced from the cameras 226 and 228 so triangulation can be used to determined distance from cameras 226 and 228. In some implementations, the capture device 120 will include a dedicated IR sensor to sense the IR light.

According to another embodiment, the capture device 120 may include two or more physically separated cameras that may view a scene from different angles to obtain visual stereo data that may be resolved to generate depth information. Other types of depth image sensors can also be used to create a depth image.

The capture device 120 may further include a microphone 130. The microphone 130 may include a transducer or sensor that may receive and convert sound into an electrical signal. According to one embodiment, the microphone 130 may be used to reduce feedback between the capture device 120 and the computing system 112 in the target recognition, analysis, and tracking system 100. Additionally, the microphone 130 may be used to receive audio signals (e.g., voice commands) that may also be provided by the user to control applications such as game applications, non-game applications, or the like that may be executed by the computing system 112.

In an example embodiment, the capture device 120 may further include a processor 232 that may be in operative communication with the image camera component 222. The processor 232 may include a standardized processor, a specialized processor, a microprocessor, or the like that may execute instructions including, for example, instructions for receiving a depth image, generating the appropriate data format (e.g., frame) and transmitting the data to computing system 112.

The capture device 120 may further include a memory component 234 that may store the instructions that may be executed by the processor 232, images or frames of images captured by the 3-D camera and/or RGB camera, or any other suitable information, images, or the like. According to an example embodiment, the memory component 234 may include random access memory (RAM), read only memory (ROM), cache, Flash memory, a hard disk, or any other suitable storage component. As shown in FIG. 2A, in one embodiment, the memory component 234 may be a separate component in communication with the image capture component 222 and the processor 232. According to another embodiment, the memory component 234 may be integrated into the processor 232 and/or the image capture component 222.

As shown in FIG. 2A, the capture device 120 may be in communication with the computing system 212 via a communication link 236. The communication link 236 may be a wired connection including, for example, a USB connection, a Firewire connection, an Ethernet cable connection, or the like and/or a wireless connection such as a wireless 802.11b, g, a, or n connection. According to one embodiment, the computing system 112 may provide a clock to the capture device 120 that may be used to determine when to capture, for example, a scene via the communication link 236. Additionally, the capture device 120 provides the depth images and color images captured by, for example, the 3-D camera 226 and/or the RGB camera 228 to the computing system 112 via the communication link 236. In one embodiment, the depth images and color images are transmitted at 30 frames per second. The computing system 112 may then use the model, depth information, and captured images to, for example, control an application such as a game or word processor and/or animate an avatar or on-screen character.

Computing system 112 includes gestures library 240, structure data 242, depth image processing and object reporting module 244 and application 246. Depth image processing and object reporting module 244 uses the depth images to track motion of objects, such as the user and other objects. To assist in the tracking of the objects, depth image processing and object reporting module 244 uses gestures library 240 and structure data 242.

Structure data 242 includes structural information about objects that may be tracked. For example, a skeletal model of a human may be stored to help understand movements of the user and recognize body parts. Structural information about inanimate objects may also be stored to help recognize those objects and help understand movement.

Gestures library 240 may include a collection of gesture filters, each comprising information concerning a gesture that may be performed by the skeletal model (as the user moves). The data captured by the cameras 226, 228 and the capture device 120 in the form of the skeletal model and movements associated with it may be compared to the gesture filters in the gesture library 240 to identify when a user (as represented by the skeletal model) has performed one or more gestures. Those gestures may be associated with various controls of an application. Thus, the computing system 112 may use the gestures library 240 to interpret movements of the skeletal model and to control application 246 based on the movements. As such, gestures library may be used by depth image processing and object reporting module 244 and application 246.

Application 246 can be a video game, productivity application, etc. In one embodiment, depth image processing and object reporting module 244 will report to application 246 an identification of each object detected and the location of the object for each frame. Application 246 will use that information to update the position or movement of an avatar or other images in the display.

Figure 2B:
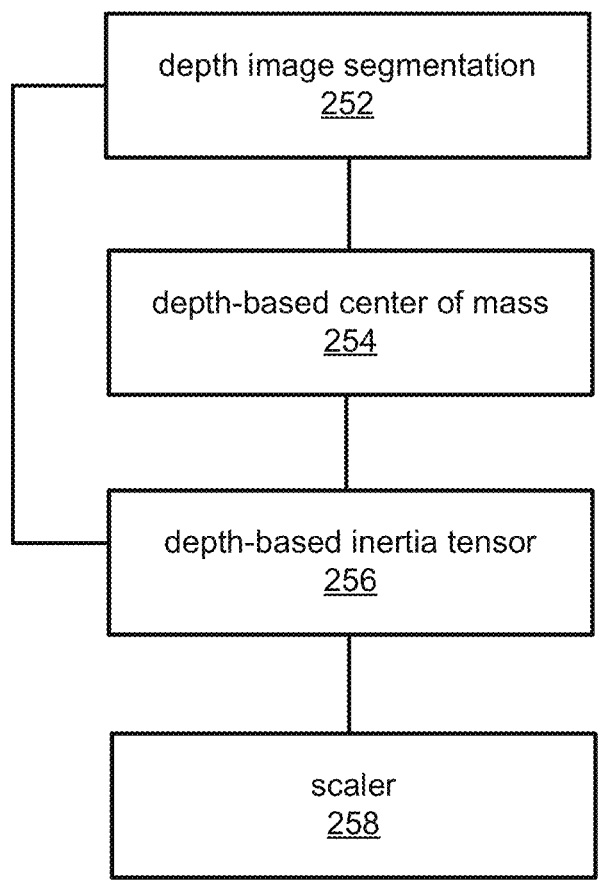
FIG. 2B illustrates an example embodiment of the depth image processing and object reporting module introduced in FIG. 2A.

FIG. 2B illustrates an example embodiment of the depth image processing and object reporting module 244 introduced in FIG. 2A. Referring to FIG. 2B, the depth image processing and object reporting module 244 is shown as including a depth image segmentation module 252, a depth-based center-of-mass module 254, a depth-based inertia tensor module 256 and a scaler 258. In an embodiment, the depth image segmentation module 252 is configured to detect one or more users (e.g., human targets) within a depth image, and associates a segmentation value with each pixel. Such segmentation values are used to indicate which pixels correspond to a user. For example, a segmentation value of 1 can be assigned to all pixels that correspond to a first user, a segmentation value of 2 can be assigned to all pixels that correspond to a second user, and an arbitrary predetermined value (e.g., 255) can be assigned to the pixels that do not correspond to a user. It is also possible that segmentation values can be assigned to objects, other than users, that are identified within a depth image, such as, but not limited to, a tennis racket, a jump rope, a ball, a floor, or the like. In an embodiment, as a result of a segmentation process performed by the depth image segmentation module 252, each pixel in a depth image will have four values associated with the pixel, including: an x-position value (i.e., a horizontal value); a y-position value (i.e., a vertical value); a z-position value (i.e., a depth value); and a segmentation value, which was just explained above. In other words, after segmentation, a depth image can specify that a plurality of pixels correspond to a user, wherein such pixels can also be referred to as a depth-based silhouette of a user. Additionally, the depth image can specify, for each of the pixels corresponding to the user, a pixel location and a pixel depth. The pixel location can be indicated by an x-position value (i.e., a horizontal value) and a y-position value (i.e., a vertical value). The pixel depth can be indicated by a z-position value (also referred to as a depth value), which is indicative of a distance between the capture device (e.g., 120) used to obtain the depth image and the portion of the user represented by the pixel.

Still referring to FIG. 2B, in an embodiment, the depth-based center-of-mass module 254 is used to determine a depth-based center-of-mass position for the plurality of pixels corresponding to a user that accounts for distances between the portions of the user represented by the pixels and the capture device used to obtain the depth image. Additional details relating to determining a depth-based center-of-mass position are described below with reference to FIGS. 7A-8B. In an embodiment, the depth-based inertia tensor module 256 is used to determine a depth-based inertia tensor for the plurality of pixels corresponding to a user, based on the determined depth-based center-of-mass position for the plurality of pixels corresponding to the user. Additional details relating to determining a depth-based inertia tensor are described below with reference to FIGS. 7A-8B. As described in additional detail, with reference to FIGS. 7A-8B, the scaler 258 can be used to scale a determined depth-based inertia tensor using an assumption that a plurality of pixels corresponding to a user has a predetermined mass (e.g., 75 kg).

Figure 3:
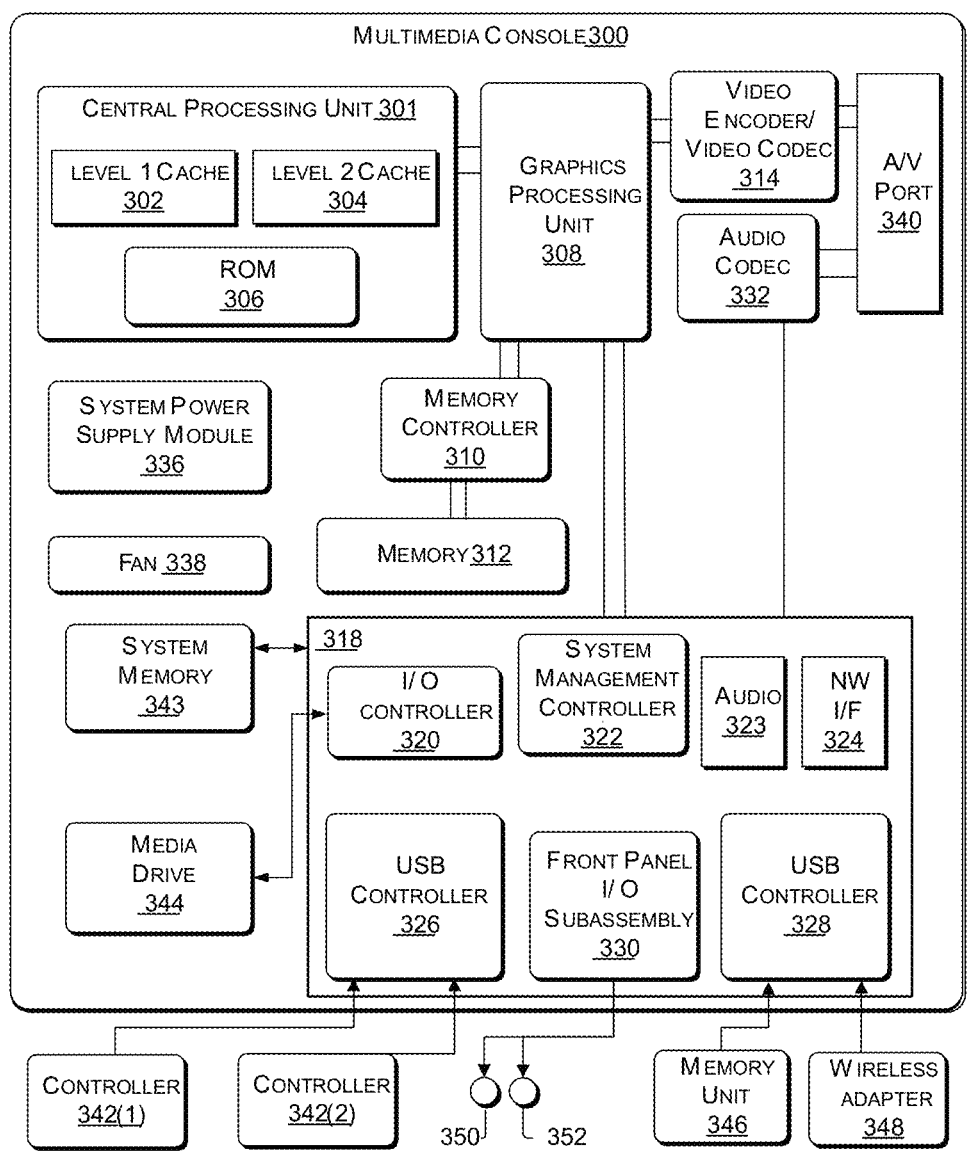
FIG. 3 illustrates an example embodiment of a computing system that may be used to track user behavior and update an application based on the user behavior.

FIG. 3 illustrates an example embodiment of a computing system that may be the computing system 112 shown in FIGS. 1A-2B used to track motion and/or animate (or otherwise update) an avatar or other on-screen object displayed by an application. The computing system such as the computing system 112 described above with respect to FIGS. 1A-2 may be a multimedia console, such as a gaming console. As shown in FIG. 3, the multimedia console 300 has a central processing unit (CPU) 301 having a level 1 cache 302, a level 2 cache 304, and a flash ROM (Read Only Memory) 306. The level 1 cache 302 and a level 2 cache 304 temporarily store data and hence reduce the number of memory access cycles, thereby improving processing speed and throughput. The CPU 301 may be provided having more than one core, and thus, additional level 1 and level 2 caches 302 and 304. The flash ROM 306 may store executable code that is loaded during an initial phase of a boot process when the multimedia console 300 is powered ON.

A graphics processing unit (GPU) 308 and a video encoder/video codec (coder/decoder) 314 form a video processing pipeline for high speed and high resolution graphics processing. Data is carried from the graphics processing unit 308 to the video encoder/Video codec 314 via a bus. The video processing pipeline outputs data to an A/V (audio/video) port 340 for transmission to a television or other display. A memory controller 310 is connected to the GPU 308 to facilitate processor access to various types of memory 312, such as, but not limited to, a RAM (Random Access Memory).

The multimedia console 300 includes an I/O controller 320, a system management controller 322, an audio processing unit 323, a network interface 324, a first USB host controller 326, a second USB controller 328 and a front panel I/O subassembly 330 that are preferably implemented on a module 318. The USB controllers 326 and 328 serve as hosts for peripheral controllers 342(1)-342(2), a wireless adapter 348, and an external memory device 346 (e.g., flash memory, external CD/DVD ROM drive, removable media, etc.). The network interface 324 and/or wireless adapter 348 provide access to a network (e.g., the Internet, home network, etc.) and may be any of a wide variety of various wired or wireless adapter components including an Ethernet card, a modem, a Bluetooth module, a cable modem, and the like.

System memory 343 is provided to store application data that is loaded during the boot process. A media drive 344 is provided and may comprise a DVD/CD drive, Blu-Ray drive, hard disk drive, or other removable media drive, etc. The media drive 344 may be internal or external to the multimedia console 300. Application data may be accessed via the media drive 344 for execution, playback, etc. by the multimedia console 300. The media drive 344 is connected to the I/O controller 320 via a bus, such as a Serial ATA bus or other high speed connection (e.g., IEEE 1394).

The system management controller 322 provides a variety of service functions related to assuring availability of the multimedia console 300. The audio processing unit 323 and an audio codec 332 form a corresponding audio processing pipeline with high fidelity and stereo processing. Audio data is carried between the audio processing unit 323 and the audio codec 332 via a communication link. The audio processing pipeline outputs data to the A/V port 340 for reproduction by an external audio player or device having audio capabilities.

The front panel I/O subassembly 330 supports the functionality of the power button 350 and the eject button 352, as well as any LEDs (light emitting diodes) or other indicators exposed on the outer surface of the multimedia console 300. A system power supply module 336 provides power to the components of the multimedia console 300. A fan 338 cools the circuitry within the multimedia console 300.

The CPU 301, GPU 308, memory controller 310, and various other components within the multimedia console 300 are interconnected via one or more buses, including serial and parallel buses, a memory bus, a peripheral bus, and a processor or local bus using any of a variety of bus architectures. By way of example, such architectures can include a Peripheral Component. Interconnects (PCI) bus, PCI-Express bus, etc.

When the multimedia console 300 is powered ON, application data may be loaded from the system memory 343 into memory 312 and/or caches 302, 304 and executed on the CPU 301. The application may present a graphical user interface that provides a consistent user experience when navigating to different media types available on the multimedia console 300. In operation, applications and/or other media contained within the media drive 344 may be launched or played from the media drive 344 to provide additional functionalities to the multimedia console 300.

The multimedia console 300 may be operated as a standalone system by simply connecting the system to a television or other display. In this standalone mode, the multimedia console 300 allows one or more users to interact with the system, watch movies, or listen to music. However, with the integration of broadband connectivity made available through the network interface 324 or the wireless adapter 348, the multimedia console 300 may further be operated as a participant in a larger network community.

When the multimedia console 300 is powered ON, a set amount of hardware resources are reserved for system use by the multimedia console operating system. These resources may include a reservation of memory (e.g., 16 MB), CPU and GPU cycles (e.g., 5%), networking bandwidth (e.g., 8 Kbps), etc. Because these resources are reserved at system boot time, the reserved resources do not exist from the application's view.

In particular, the memory reservation preferably is large enough to contain the launch kernel, concurrent system applications and drivers. The CPU reservation is preferably constant such that if the reserved. CPU usage is not used by the system applications, an idle thread will consume any unused cycles.

With regard to the GPU reservation, lightweight messages generated by the system applications (e.g., popups) are displayed by using a GPU interrupt to schedule code to render popup into an overlay. The amount of memory required for an overlay depends on the overlay area size and the overlay preferably scales with screen resolution. Where a full user interface is used by the concurrent system application, it is preferable to use a resolution independent of application resolution. A scaler may be used to set this resolution such that the need to change frequency and cause a TV resync is eliminated.

After the multimedia console 300 boots and system resources are reserved, concurrent system applications execute to provide system functionalities. The system functionalities are encapsulated in a set of system applications that execute within the reserved system resources described above. The operating system kernel identifies threads that are system application threads versus gaming application threads. The system applications are preferably scheduled to run on the CPU 301 at predetermined times and intervals in order to provide a consistent system resource view to the application. The scheduling is to minimize cache disruption for the gaming application running on the cons ole.

When a concurrent system application requires audio, audio processing is scheduled asynchronously to the gaming application due to time sensitivity. A multimedia console application manager (described below) controls the gaming application audio level (e.g., mute, attenuate) when system applications are active.

Input devices (e.g., controllers 342(1) and 342(2)) are shared by gaining applications and system applications. The input devices are not reserved resources, but are to be switched between system applications and the gaming application such that each will have a focus of the device. The application manager preferably controls the switching of input stream, without knowledge the gaming application's knowledge and a driver maintains state information regarding focus switches. The cameras 226, 228 and capture device 120 may define additional input devices for the console 300 via USB controller 326 or other interface.

Figure 4:
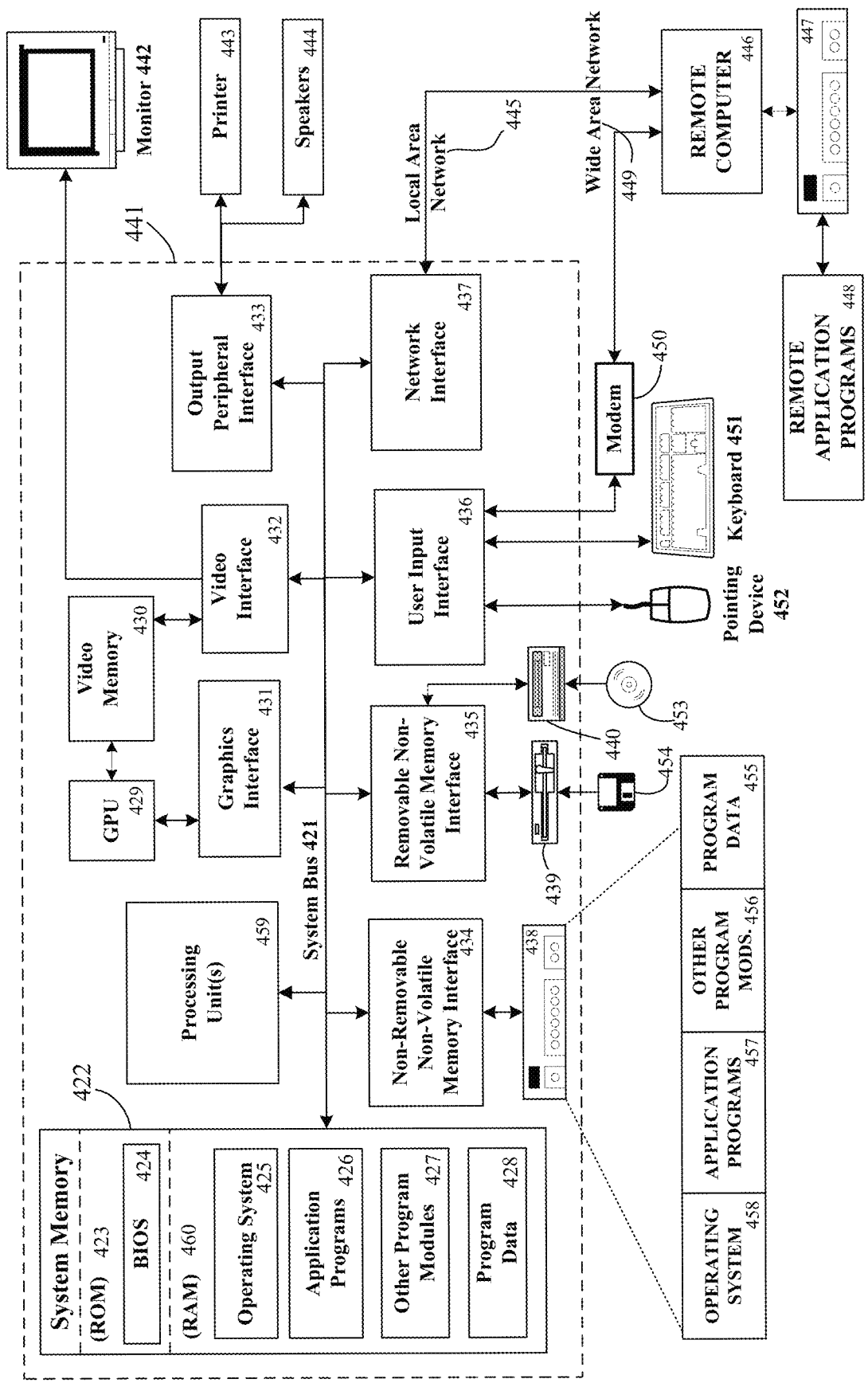
FIG. 4 illustrates another example embodiment of a computing system that may be used to track user behavior and update an application based on the tracked user behavior.

FIG. 4 illustrates another example embodiment of a computing system 420 that may be the computing system 112 shown in FIGS. 1A-2B used to track motion and/or animate (or otherwise update) an avatar or other on-screen object displayed by an application. The computing system 420 is only one example of a suitable computing system and is not intended to suggest any limitation as to the scope of use or functionality of the presently disclosed subject matter. Neither should the computing system 420 be interpreted as having any dependency or requirement relating to any one or combination of components illustrated in the exemplary computing system 420. In some embodiments the various depicted computing elements may include circuitry configured to instantiate specific aspects of the present disclosure. For example, the term circuitry used in the disclosure can include specialized hardware components configured to perform function(s) by firmware or switches. In other examples embodiments the term circuitry can include a general purpose processing unit, memory, etc., configured by software instructions that embody logic operable to perform function(s). In example embodiments where circuitry includes a combination of hardware and software, an implementer may write source code embodying logic and the source code can be compiled into machine readable code that can be processed by the general purpose processing unit. Since one skilled in the art can appreciate that the state of the art has evolved to a point where there is little difference between hardware, software, or a combination of hardware/software, the selection of hardware versus software to effectuate specific functions is a design choice left to an implementer. More specifically, one of skill in the art can appreciate that a software process can be transformed into an equivalent hardware structure, and a hardware structure can itself be transformed into an equivalent software process. Thus, the selection of a hardware implementation versus a software implementation is one of design choice and left to the implementer.

Computing system 420 comprises a computer 441, which typically includes a variety of computer readable media. Computer readable media can be any available media that can be accessed by computer 441 and includes both volatile and nonvolatile media, removable and non-removable media. The system memory 422 includes computer storage media in the form of volatile and/or nonvolatile memory such as read only memory (ROM) 423 and random access memory (RAM) 460. A basic input/output system 424 (BIOS), containing the basic routines that help to transfer information between elements within computer 441, such as during start-up, is typically stored in ROM 423. RAM 460 typically contains data and/or program modules that are immediately accessible to and/or presently being operated on by processing unit 459. By way of example, and not limitation, FIG. 4 illustrates operating system 425, application programs 426, other program modules 427, and program data 428.

The computer 441 may also include other removable/non-removable, volatile/nonvolatile computer storage media. By way of example only, FIG. 4 illustrates a hard disk drive 438 that reads from or writes to non-removable, nonvolatile magnetic media, a magnetic disk drive 439 that reads from or writes to a removable, nonvolatile magnetic disk 454, and an optical disk drive 440 that reads from or writes to a removable, nonvolatile optical disk 453 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 438 is typically connected to the system bus 421 through a non-removable memory interface such as interface 434, and magnetic disk drive 439 and optical disk drive 440 are typically connected to the system bus 421 by a removable memory interface, such as interface 435.

The drives and their associated computer storage media discussed above and illustrated in FIG. 4, provide storage of computer readable instructions, data structures, program modules and other data for the computer 441. In FIG. 4, for example, hard disk drive 438 is illustrated as storing operating system 458, application programs 457, other program modules 456, and program data 455. Note that these components can either be the same as or different from operating system 425, application programs 426, other program modules 427, and program data 428. Operating system 458, application programs 457, other program modules 456, and program data 455 are given different numbers here to illustrate that, at a minimum, they are different copies. A user may enter commands and information into the computer 441 through input devices such as a keyboard 451 and pointing device 452, commonly referred to as a mouse, trackball or touch pad. Other input devices (not shown) may include a microphone, joystick, game pad, satellite dish, scanner, or the like. These and other input devices are often connected to the processing unit 459 through a user input interface 436 that is coupled to the system bus 421, but may be connected by other interface and bus structures, such as a parallel port, game port or a universal serial bus (USB). The cameras 226, 228 and capture device 120 may define additional input devices for the computing system 420 that connect via user input interface 436. A monitor 442 or other type of display device is also connected to the system bus 421 via an interface, such as a video interface 432. In addition to the monitor, computers may also include other peripheral output devices such as speakers 444 and printer 443, which may be connected through an output peripheral interface 433. Capture Device 120 may connect to computing system 420 via output peripheral interface 433, network interface 437, or other interface. FIG. 4 also shows a graphics interface 431 coupled to the system bus 421, video memory 430 coupled to the video interface 432, and a graphical processing unit (GPU) coupled to the video memory 430 and the graphics interface 431.

The computer 441 may operate in a networked environment using logical connections to one or more remote computers, such as a remote computer 446. The remote computer 446 may be a personal computer, a server, a router, a network PC, a peer device or other common network node, and typically includes many or all of the elements described above relative to the computer 441, although only a memory storage device 447 has been illustrated in FIG. 4. The logical connections depicted include a local area network (LAN) 445 and a wide area network (WAN) 449, but may also include other networks. Such networking environments are commonplace in offices, enterprise-wide computer networks, intranets and the Internet.

When used in a LAN networking environment, the computer 441 is connected to the LAN 445 through a network interface 437. When used in, a WAN networking environment, the computer 441 typically includes a modem 450 or other means for establishing communications over the WAN 449, such as the Internet. The modem 450, which may be internal or external, may be connected to the system bus 421 via the user input interface 436, or other appropriate mechanism. In a networked environment, program modules depicted relative to the computer 441, or portions thereof, may be stored in the remote memory storage device. By way of example, and not limitation, FIG. 4 illustrates application programs 448 as residing on memory device 447. It will be appreciated that the network connections shown are exemplary and other means of establishing a communications link between the computers may be used.

As explained above, the capture device 120 provides RGB images (also known as color images) and depth images to the computing system 112. The depth image may be a plurality of observed pixels where each observed pixel has an observed depth value. For example, the depth image may include a two-dimensional (2-D) pixel area of the captured scene where each pixel in the 2-D pixel area may have a depth value such as a length or distance in, for example, centimeters, millimeters, or the like of an object in the captured scene from the capture device.

As mentioned above, skeletal tracking (ST) techniques are often used to detect motion of a user or other user behaviors. However, while useful for detecting certain types of user behaviors, ST techniques have proven to be unreliable for detecting other types of user behavior. For example, ST techniques are typically unreliable for detecting user behaviors where the user is laying or sitting on or near the floor. Certain embodiments described herein rely on depth images to detect user behaviors. Such user behaviors detected based on depth base images can be used in place of, or to supplement, ST techniques for detecting user behaviors. Accordingly, before discussing such embodiments in additional detail, it would first be useful to provide additional details of depth images.

Figure 5:
FIG. 5 illustrates an exemplary depth image.

FIG. 5 illustrates an example embodiment of a depth image that may be received at computing system 112 from capture device 120. According to an example embodiment, the depth image may be an image and/or frame of a scene captured by, for example, the 3-D camera 226 and/or the RGB camera 228 of the capture device 120 described above with respect to FIG. 2A. As shown in FIG. 5, the depth image may include a human target corresponding to, for example, a user such as the user 118 described above with respect to FIGS. 1A and 1B and one or more non-human targets such as a wall, a table, a monitor, or the like in the captured scene. As described above, the depth image may include a plurality of observed pixels where each observed pixel has an observed depth value associated therewith. For example, the depth image may include a two-dimensional (2-D) pixel area of the captured scene where each pixel at particular x-value and y-value in the 2-D pixel area may have a depth value such as a length or distance in, for example, centimeters, millimeters, or the like of a target or object in the captured scene from the capture device. In other words, as explained above in the discussion of FIG. 2B, a depth image can specify, for each of the pixels in the depth image, a pixel location and a pixel depth. Following a segmentation process, e.g., performed by the by the depth image processing and object reporting module 244, each pixel in the depth image can also have a segmentation value associated with it. The pixel location can be indicated by an x-position value (i.e., a horizontal value) and a y-position value (i.e., a vertical value). The pixel depth can be indicated by a z-position value (also referred to as a depth value), which is indicative of a distance between the capture device (e.g., 120) used to obtain the depth image and the portion of the user represented by the pixel. The segmentation value is used to indicate whether a pixel corresponds to a specific user, or does not correspond to a user.

In one embodiment, the depth image may be colorized or grayscale such that different colors or shades of the pixels of the depth image correspond to and/or visually depict different distances of the targets from the capture device 120. Upon receiving the image, one or more high-variance and/or noisy depth values may be removed and/or smoothed from the depth image; portions of missing and/or removed depth information may be filled in and/or reconstructed; and/or any other suitable processing may be performed on the received depth image.

FIG. 6 provides another view/representation of a depth image (not corresponding to the same example as FIG. 5). The view of FIG. 6 shows the depth data for each pixel as an integer that represents the distance of the target to capture device 120 for that pixel. The example depth image of FIG. 6 shows 24×24 pixels; however, it is likely that a depth image of greater resolution would be used.

Depending upon what user behavior is being tracked, it would sometimes be useful to be able to determine and track a center-of-mass position for a user. For example, such information can be used to track a user performing certain exercises, such as squats, lunges, push-ups, jumps, or jumping jacks so that an avatar of the user can be controlled, points can be awarded to the user and/or feedback can be provided to the user. Certain embodiments, which are discussed below, relate to techniques for determining a center-of-mass position based on a depth image, and thus, such a position shall be referred to hereafter as a depth-based center-of-mass position.

The conventional center-of-mass equation is shown below:

$$P = \frac{1}{M}\sum_{i=1}^{n} m_i R_i \quad \text{(Equation 1)}$$

where P is the final center-of-mass position, M is the sum of the masses ($M=\Sigma_{i=1}^{n}m_i$), n is the number of body parts, $m_i$ is the mass of the particular body part, and $R_i$ is the position of the center-of-mass of the body part (in three-dimensions). The above equation can be used, e.g., by an ST system that determines a center-of-mass position.

In accordance with an embodiment, when calculating a center-of-mass based on a depth image, instead of plugging body parts into the above equation, pixels are used. Each pixel corresponds to a location in three-dimensional space, which can be computed using standard natural user interface (NUT) coordinate transforms. The "mass" or "weight" of each pixel is depth-dependent. In an embodiment, to determine the mass of a pixel, the depth value of the pixel is squared, as shown below:

$$m = d*d \quad \text{(Equation 2)}$$

where "m" is the pixel's mass, and "d" is the pixel's depth value. The net effect is to increase the "weight" of pixels further away, and decrease the "weight" of pixels closer in. The reason for this is that since a camera (e.g., 226) views the world via a view frustum, the same number of pixels farther away cover more real-world "area" than pixels close-in, and the area they cover is proportional to the distance squared. Stated another way, pixels of a depth image have a different effective surface area depending on distance. In certain embodiments described herein, a depth-based center-of-mass position is calculated in a manner that compensates for this distance. Without this compensation for distance, if a user's hand was held near a camera (e.g., 226), from the perspective of the camera the user's hand may have a visible area that is as large or larger than the rest of the user's body. This could result in an inaccurate center-of-mass position. With distance compensation, each of the pixels corresponding to the user's hand would be weighed less than pixels that corresponds to parts of the user's body that are farther away from the camera, thereby enabling a much more accurate depth-based center-of-mass position to be determined.

In accordance with an embodiment, when determining a depth-based center-of-mass position, the conventional center-of-mass equation shown above in Equation 1 is still used, except that n is the number of pixels (instead of the number of body parts) corresponding to the user, and the mass $m_i$ is computed for each pixel using Equation 2 above (instead of determining a mass for each body part). R is the position of the pixel (in three-dimensions) computed using standard NUI coordinate transform techniques. M is the sum of the $m_i$'s, i.e., $M=\Sigma_{i=1}^{n}m_i$.

An advantage of determining a depth-based center-of-mass position, based entirely on a depth image, is that a depth-based center-of-mass position can be determined even when ST techniques fail. Another advantage is that a depth-based center-of-mass position can be determined once a depth image is available in a processing pipeline, thereby reducing latency, as ST techniques do not need to be executed.

Figure 7A:
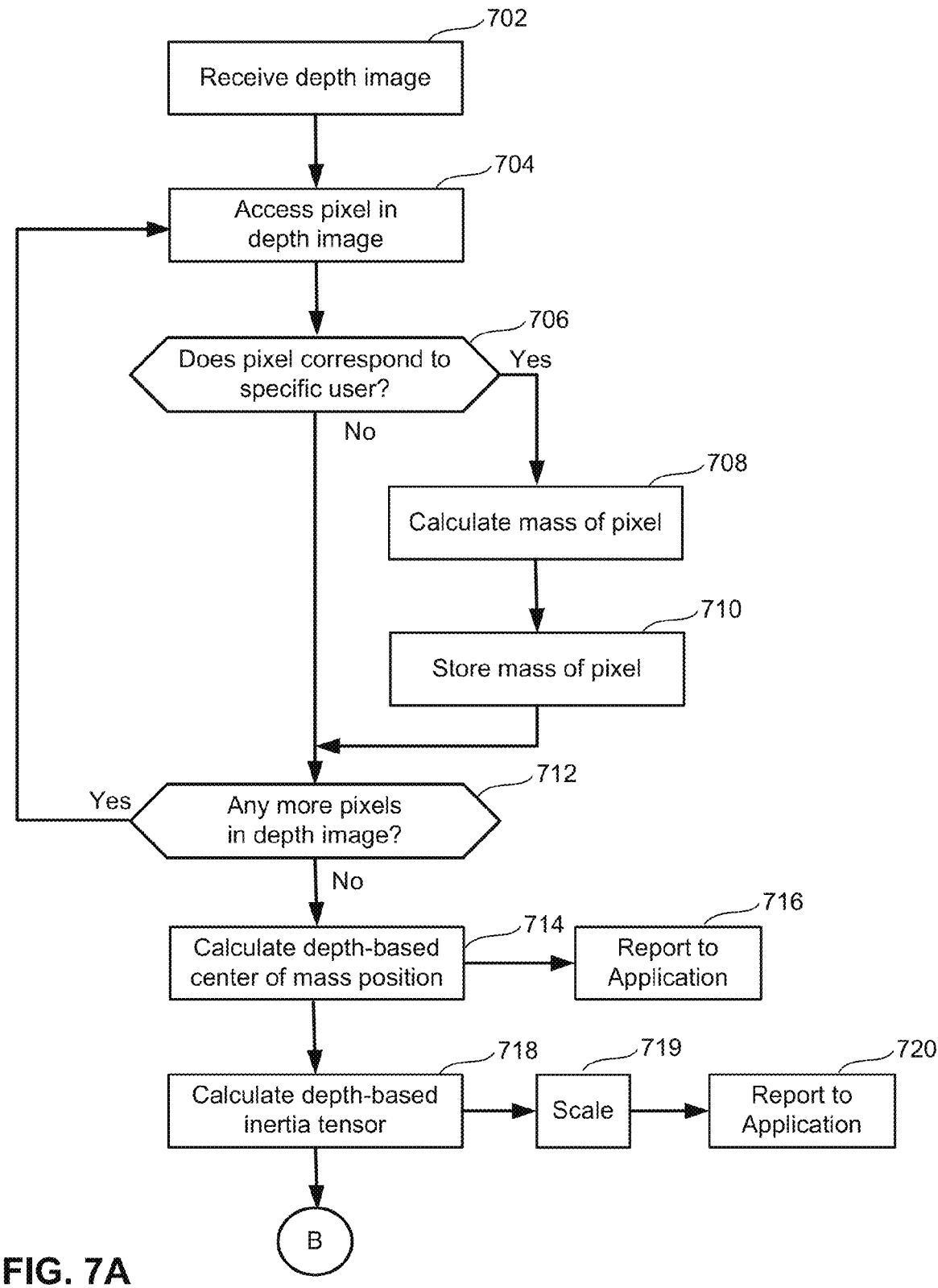
FIGS. 7A and 7B illustrate a high level flow diagram that is used to summarize methods for determining a depth-based center-of-mass position, a depth-based inertia tensor, depth-based quadrant center-of-mass positions, and depth-based quadrant inertia tensors, in accordance with specific embodiments.

The high level flow diagram of FIG. 7A will now be used to summarize a method for determining a depth-based center-of-mass position, according to an embodiment. More specifically, FIG. 7A is a flow diagram describing one embodiment of a process for determining a depth-based center-of-mass position for a plurality of pixels corresponding to a user that accounts for distances between the portions of the user represented by the pixels and the capture device used to obtain the depth image. At step 702, a depth image is received, wherein the depth image specifies that a plurality of pixels correspond to a user. The depth image can be obtained using a capture device (e.g., 120) located a distance from the user (e.g., 118). More generally, a depth image and a color image can be captured by any of the sensors in capture device 120 described herein, or other suitable sensors known in the art. In one embodiment, the depth image is captured separately from the color image. In some implementations, the depth image and color image are captured at the same time, while in other implementations they are captured sequentially or at different times. In other embodiments, the depth image is captured with the color image or combined with the color image as one image file so that each pixel has an R value, a G value, a B value and a Z value (distance). Such a depth image and a color image can be transmitted to the computing system 112. In one embodiment, the depth image and color image are transmitted at 30 frames per second. In some examples, the depth image is transmitted separately from the color image. In other embodiments, the depth image and color image can be transmitted together. Since the embodiments described herein primarily (or solely) rely on use of depth images, the remaining discussion primarily focuses on use of depth images, and thus, does not discuss the color images.

The depth image received at step 702 can also specify, for each of the pixels corresponding to the user, a pixel location and a pixel depth. As mentioned above, in the discussion of FIG. 2B, a pixel location can be indicated by an x-position value (i.e., a horizontal value) and a y-position value (i.e., a vertical value). The pixel depth can be indicated by a z-position value (also referred to as a depth value), which is indicative of a distance between the capture device (e.g., 120) used to obtain the depth image and the portion of the user represented by the pixel. For the purpose of this description it is assumed that the depth image received at step 702 has already been subject to a segmentation process that determined which pixels correspond to a user, and which pixels do not correspond to a user. Alternatively, if the depth image received at step 702 has not yet been through a segmentation process, the segmentation process can occur between steps 702 and 704.

At step 704, a pixel of the depth image is accessed. At step 706, there is a determination of whether the accessed pixel corresponds to a user for which the depth-based center-of-mass is to be determined. If the answer to the determination at step 706 is no, then flow goes to step 712. If the answer to the determination of step 706 is yes, then flow goes to step 708. At step 708, the mass of the pixel is calculated. As discussed above with reference to Equation 2, the mass of a pixel can be calculated by squaring the depth value for the pixel. Alternative techniques for determining the mass of pixel are also possible and within the scope of an embodiment, such as use of a look-up-table, or use of an alternative equation that accounts of the distance between the capture device (e.g., 120) used to obtain the depth image and the portion of the user represented by the pixel. At step 710, the calculated or otherwise determined mass of the pixel is stored (e.g., in memory).

At step 712 there is a determination of whether there are any more pixels (i.e., at least one more pixel) of the depth image that needs to be considered. If the answer to the determination at step 712 is no, then flow goes to step 714. If the answer to the determination at step 712 is yes, then flow returns to step 704 and another pixel of the depth-image is accessed.

After all of the pixels of a depth image are considered, at step 714 a depth-based center-of-mass position is determined for the plurality of pixels that correspond to the user. More specifically, at step 714 there is a determination, based on the pixel mass determined for each of the pixels corresponding to the user, of a depth-based center-of-mass position for the plurality of pixels corresponding to the user that accounts for distances between the portions of the user represented by the pixels and the capture device used to obtain the depth image. An equation for calculating the depth-based center-of-mass position was described above, and thus, need to be described again. At step 714, pixel masses stored at instances of step 710 can be accessed and applied to the aforementioned equation.

In accordance with certain embodiments, in addition to determining a depth-based center-of-mass, a depth-based inertia tensor can also be determined based on a depth image. When determining a depth-based inertia tensor, each pixel is treated as a particle, and the depth-base inertia tensor is built up relative to the determined depth-based center-of-mass position. More specifically, in an embodiment, the depth-based inertia tensor is calculated using the following equation:

$$I=\Sigma_{i=1}^{n}m_i((r_i \cdot r_i)E - r_i \otimes r_i)$$ (Equation 3)

where I is the overall 3×3 depth-based inertia tensor, n is the number of pixels corresponding to the user, $m_i$ is the mass of a particular pixel corresponding to the user (e.g., computed using Equation 2 above), $r_i$ is the three-dimensional vector from the pixel to the depth-based center-of-mass position, E is the 3×3 identity matrix, "·" is the dot product operator, and "$\otimes$" is the outer-product operator.

In accordance with certain embodiments, the depth-based inertia tensor is then scaled, under the assumption that the mass of the player's silhouette is a standard mass (e.g. 75 kg). In a specific embodiment, a scaler is calculated by summing up the $m_i$'s, and dividing the standard mass by that sum, as shown in the below equation:

$$\text{scale} = \frac{M_s}{\sum_{i=1}^{n} m_i}$$ (Equation 4)

where $M_s$ is the standard mass (e.g. 75 kg). The depth-based inertia tensor is then scaled by that scalar, as shown in the below equation:

$$I_{scaled} = \text{scale} * I$$ (Equation 5).

A reason for scaling the depth-based inertia tensor is so that updates to an application, to which the scaled depth-based inertia tensor is being reported, are not influenced by the size of the user. In other words, the scaling enables an application (e.g., 246) to interpret movements or other behaviors by a relatively husky user similarly to how the application interprets movements or other behaviors by a relatively skinny user. Another reason for scaling the depth-based inertia tensor is so that updates to an application, to which the scaled depth-based inertia tensor is being reported, are not influenced by how close a user is positioned relative to the capture device. In other words, the sealing enables an application (e.g., 246) to interpret movements or other behaviors by a user positioned relatively close to the capture device similarly to how the application interprets movements or other behaviors of a user positioned relative far away from the capture device. A scaled depth-based inertia tensor can also be referred to as a scaled version of the depth-based inertia tensor.

Where more than one user is represented in a depth image, a separate instance of the method of FIG. 7A (and FIG. 7B discussed below) can be performed for each user. For example, assume that a first group of pixels in a depth image correspond to a first user, and a second group of pixels in the same depth image correspond to a second user. This would result in is a first depth-based center-of-mass position for the plurality of pixels corresponding to the first user that accounts for distances between the portions of the first user represented by the first group of pixels and the capture device used to obtain the depth image. This would also result in is a second depth-based center-of-mass position for the plurality of pixels corresponding to the second user that accounts for distances between the portions of the second user represented by the second group of pixels and the capture device used to obtain the depth image. Additionally, this can result in a first depth-based inertia tensor for the plurality of pixels corresponding to the first user, and a second depth-based inertia tensor for the plurality of pixels corresponding to the second user.

The method described with reference to FIG. 7A can be repeated for additional depth images, thereby resulting in a depth-based center-of-mass position, as well as a depth-based inertia tensor, being determined for each of a plurality of depth images. Where more than one user is represented in a depth image, each time the method is repeated, a separate depth-based center-of-mass position and depth-based inertia tensor can be determined for each user represented in the depth image. The determined depth-based center-of-mass positions and depth-based inertia tensors, and/or changes therein, can be used to track user behaviors, and changes in user behaviors. For example, determined depth-based center-of-mass positions and/or depth-based inertia tensors can be reported to an application (e.g., 246), as indicated at steps 716 and 720, and the application can be updated based on the depth-based center-of-mass positions and/or depth-based inertia tensors reported to an application. As indicated at step 719, the depth-based inertia tensor can be scaled before it is reported to an application, as was described above in the discussion of Equation 5.

In an embodiment, the principal axes of a depth-based inertia tensor can be determined and used to identify the "long axis" of a user when the user is extended (e.g., standing, in a push-up position, or in a plank position). More specifically, the depth-based inertia tensor can be decomposed into eigenvectors and eigenvalues. The "long axis" of the user can then be identified by identifying the shortest eigenvalue's eigenvector. For example, when a user is standing, the eigenvector associated with the smallest eigenvalue will be straight up. For another example, when a user is in a push-up or plank position, the eigenvector associated with the smallest eigenvalue will be along the user's body line.

For certain applications, depth-based center-of-mass positions and/or depth-based inertia tensors may provide the applications with sufficient information to update the applications. For other applications, depth-based center-of-mass positions and/or depth-based inertia tensors may provide the applications with insufficient information to update the applications. For example, where an application is attempting to determine whether a user is properly performing a jumping jack type of exercise, it may be insufficient for the application to solely keep track of depth-based center-of-mass positions and/or depth-based inertia tensors.

Figure 7B:
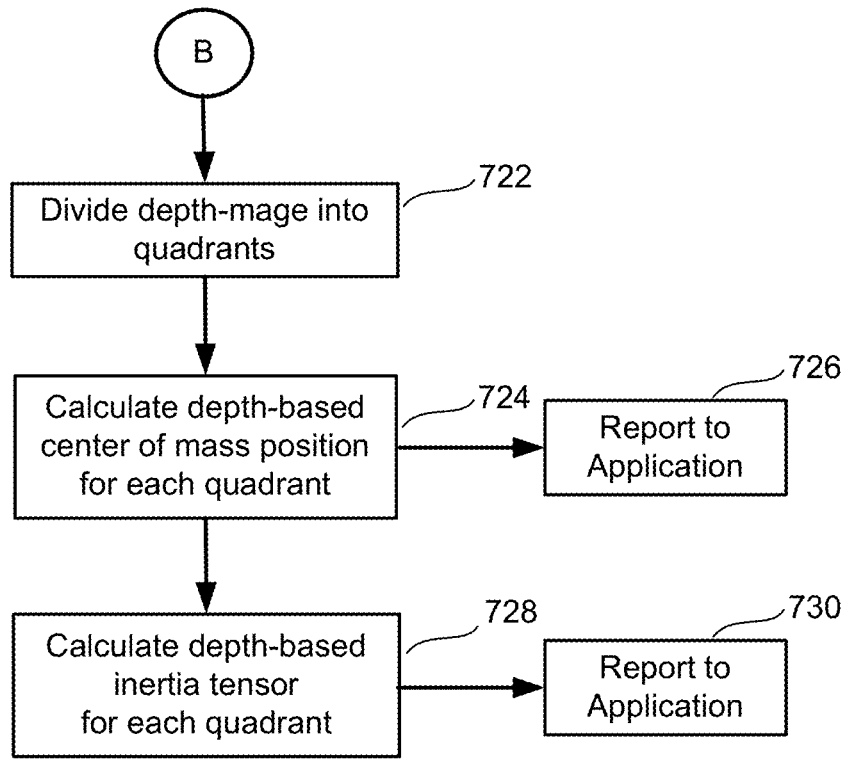

Referring now to FIG. 7B, as indicated at steps 722 and 724, in accordance with certain embodiments, in order to glean additional useful information from a depth image, a plurality of pixels corresponding to a user is divided into quadrants, and a separate depth-based quadrant center-of-mass position is determined for each of the quadrants. Additionally, a separate depth-based quadrant inertia tensor can be determined for each of the quadrants, as indicated at step 728. The determined depth-based quadrant center-of-mass positions and depth-based quadrant inertia tensors, and/or changes therein, can be used to track user behaviors, and changes in user behaviors. More specifically, the determined depth-based quadrant center-of-mass positions and/or depth-based quadrant inertia tensors can be reported to an application (e.g., 246), as indicated at steps 726 and 730, and the application can be updated based on the depth-based quadrant center-of-mass positions and/or depth-based quadrant inertia tensors reported to an application. Tracking changes in depth-based quadrant center-of-mass positions and/or depth-based quadrant inertia tensors enables changes in position (and thus, motion) of specific body parts and/or changes in the mass distribution of a user to be tracked, as can be appreciated from FIGS. 5A and 8B discussed below.

In an embodiment, when dividing a plurality of pixels corresponding to a user (of a depth image) into quadrants at step 724, the depth-based center-of-mass position determined at step 714 is used as the point where the corners of all four of the quadrants meet one another. Explained another way, at step 724, two lines that intersect at the depth-based center-of-mass position determined at step 714 can be used to divide a plurality of pixels corresponding to a user (of a depth image) into quadrants. In an embodiment, one such line can be a vertical line that is straight up-and-down and intersects the depth-based center-of-mass position determined at step 714, and the other line can be a horizontal line that is perpendicular to the vertical line and intersects the vertical line at the depth-based center-of-mass position. However, using such arbitrarily drawn lines to divide the plurality of pixels corresponding to a user (of a depth image) into quadrants does not take into account the actual position of the user. Another technique, according to an alternative embodiment, is to identify the principal axes of the depth-based inertia tensor, and selecting one of the principal axes to use as the line that divides the plurality of pixels corresponding to a user (of a depth image) lengthwise. A line perpendicular to the selected one of the principal axes (used as the aforementioned dividing line) that intersects the depth-based center-of-mass position (determined at step 714) can then be used as the line the divides the plurality of pixels corresponding to a user (of a depth image) widthwise. These techniques can be further appreciated from the below discussion of FIGS. 8A and 8B.

Figure 8A:
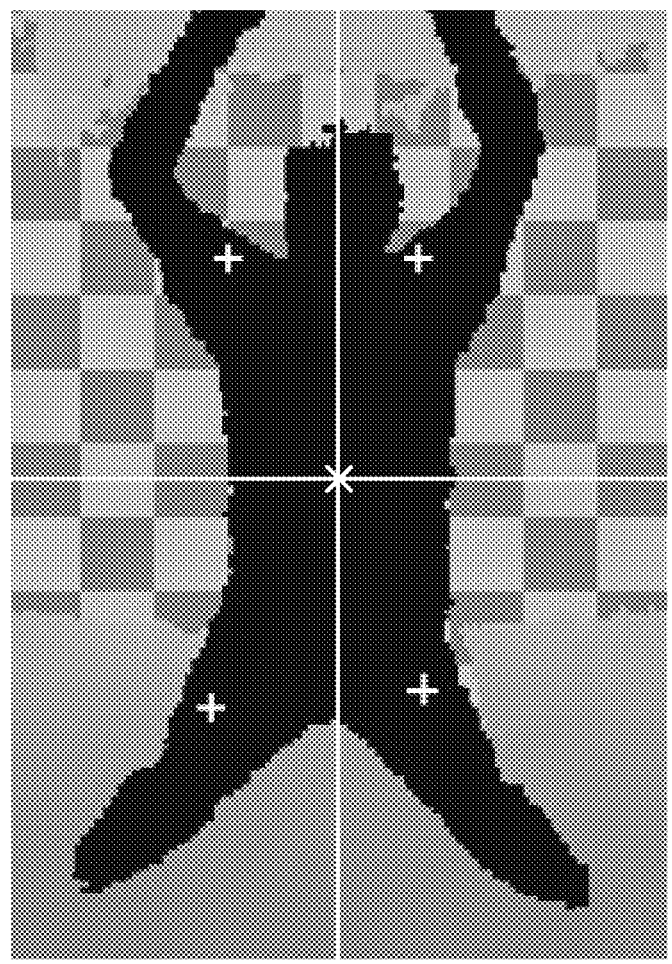
FIG. 8A, which shows a silhouette representing a plurality of pixels corresponding to a user (of a depth image) performing a jumping jack, is used to illustrate an exemplary depth-based center-of-mass position, and exemplary depth-based quadrant center-of-mass positions.

Referring to FIG. 8A, the silhouette shown therein, represents a plurality of pixels corresponding to a user of a depth image. The White "x" in the middle of the silhouette represents that depth-based center-of-mass position determined for the plurality of pixels corresponding to the user. The horizontal and vertical white lines that intersect the silhouette at the white "x" illustrate lines that can be used to divide the plurality of pixels corresponding to the user into quadrants. The four white "+"s represent the depth-based quadrant center-of-mass positions determined for the respective quadrants. The user represented in the depth image is performing a jumping jack type of exercise. If only the depth-based center-of-mass position (represented by the white "x") were being tracked for a plurality of consecutive depth images, then the depth-based center-of-mass position may move up and down over time. However, it would be difficult to determine, based solely on the depth-based center-of-mass position moving up and down, whether the user is simply jumping up and down (without moving their arms and legs as should be done in a proper jumping jack), or is performing a proper jumping jack. Additional useful information can be gleaned where a depth-based quadrant center-of-mass position determined for each of the quadrants, as can be appreciated from FIG. 8A. For example, it is expected that each depth-based quadrant center-of-mass position will move back and forth along a predictable path when the user performs a proper jumping jack. Even further useful information can be gleaned by determining a depth-based quadrant inertia tensor for each of the quadrants. For example, the depth-based quadrant inertia tensor can be used to determine whether a user is moving a specific limb toward the capture device, or away from the capture device. These are just a few examples of the types of user behaviors that can be deciphered by analyzing depth-based quadrant center-of-mass positions and/or depth-based quadrant inertia tensors. One of ordinary skill in the art reading this description will appreciate that a myriad of other behaviors can also be identified based on depth-based quadrant center-of-mass positions and/or depth-based quadrant inertia tensors.

Figure 8B:
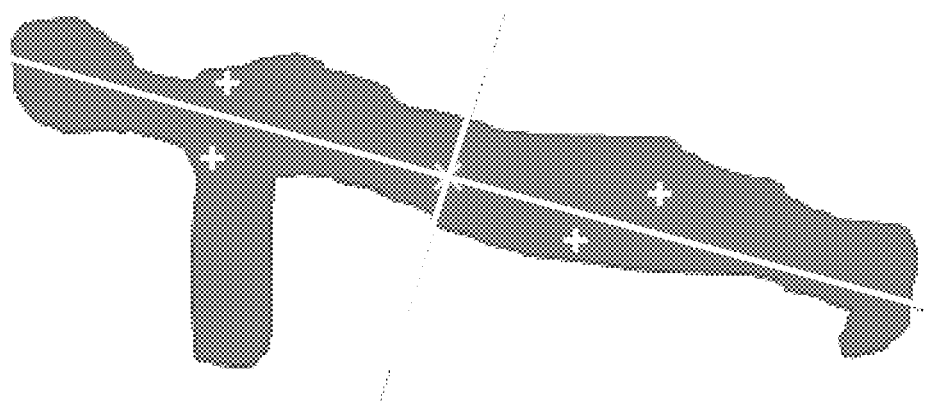
FIG. 8B, which shows a silhouette representing a plurality of pixels corresponding to a user (of a depth image) performing a push-up, is used to illustrate an exemplary depth-based center-of-mass position, and exemplary depth-based quadrant center-of-mass positions.

FIG. 8B is used to illustrate why it is beneficial to use one of the principal axes, of a depth-based inertia tensor determined at step 718, as the line the divides the plurality of pixels corresponding to a user (of a depth image) lengthwise. Referring to FIG. 8B, the silhouette shown therein represents a plurality of pixels corresponding to a user of a depth image, where the user is performing a push-up type of exercise. In FIG. 5B, the white line that extends from the head to the feet of the silhouette corresponds one of the principal axes that is determined based on a depth-based inertia tensor. The other white line shown in FIG. 8B, which is perpendicular to the aforementioned principal axis and intersects the depth-based center-of-mass position (determined at step 714), is used as the line the divides the plurality of pixels corresponding to the user (of the depth image) widthwise. Exemplary depth-based quadrant center-of-mass positions determined for each of the quadrants are illustrated as white "+"s. In FIG. 8B, the user represented by the pixels is doing a push-up, as mentioned above. It can be appreciated from FIG. 8B that if arbitrary horizontal and vertical lines were used to divide the plurality of pixels corresponding to the user into quadrants, at least one of the quadrants may include a relatively few amount of pixels from which it would be difficult to glean useful information.

Still referring to FIG. 8B, one of the two lines that divides the plurality of pixels (corresponding to a user) into quadrants is used to separate the two upper quadrants from the two lower quadrants. Depending upon implementation, and depending upon the user's position, this line (that divides two upper from the two lower quadrants) can be a principal axis, or a line perpendicular to the principal axis.

As mentioned above, a depth image and an RGB image can be obtained using the capture device 120 and transmitted to the computing system 112 at a rate of thirty frames per second, or at some other rate. The depth image can be transmitted separately from the RGB image, or both images can be transmitted together. Continuing with the above example, the above described depth-based center-of-mass position, as well as the above described depth-based inertia tensor, can be determined for each depth image frame, and thus, thirty depth-based center-of-mass positions, as well as thirty depth-based inertia tensors can be determined per second. Additionally, for each depth image frame, depth-based quadrant center-of-mass positions and depth-based quadrant inertia tensors can be determined. Such determinations can be performed by the depth image processing and object reporting module 244 discussed above with reference to FIGS. 2A and 2B. Even more specifically, the depth-based center-of-mass module 254 and the depth-based inertia tensor module 256 discussed with reference to FIG. 2B can be used to perform such determinations.

Figure 9:
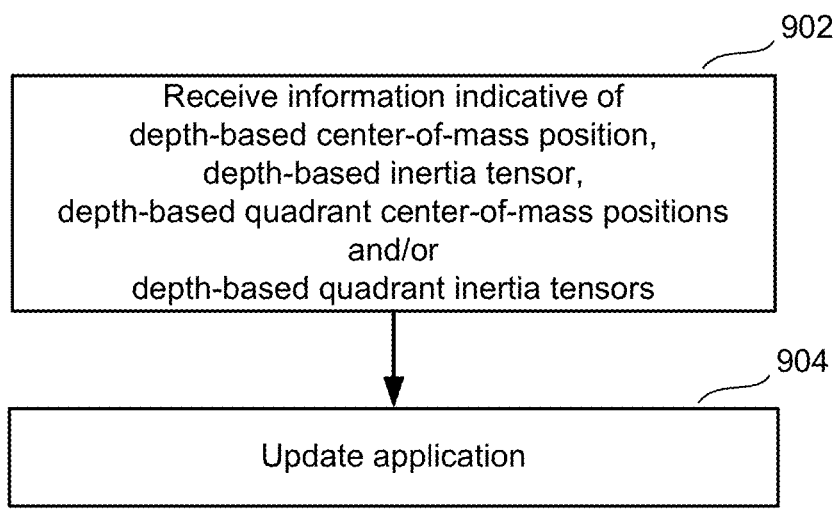
FIG. 9 illustrates a high level flow diagram that is used to summarize how an application can be updated based on information determined in accordance with embodiments described with reference to FIGS. 7A-8B.

Referring back to FIG. 2A, the depth image processing and object reporting module 244 can report its determination to the application 246. Such reporting was also discussed above with reference to steps 716, 720, 726 and 730 in FIGS. 7A and 7B. Referring now to FIG. 9, at step 902 the application receives information indicative of the depth-based center-of-mass position, the depth-based inertia tensor, the depth-based quadrant center-of-mass positions and/or the depth-based quadrant inertia tensors. As shown at step 904, the application is updated based on such information. For example, as mentioned above, such information can be used to track a user performing certain exercises, such as squats, lunges, push-ups, jumps, or jumping jacks so that an avatar of the user can be controlled, points can be awarded to the user and/or feedback can be provided to the user. For a more specific example, where the application 246 is a game that instructs a user to perform certain exercises, the application 246 can determine whether a user has performed an exercise with correct form, and where they have not, can provide feedback to the user regarding how the user can improve their form.

It is also possible that the depth image processing and object reporting module 244 interacts with the gestures library 240 to compare motion or other behavior tracked based on the depth images to depth-based gesture filters, to determine whether a user (as represented by pixels of the depth images) has performed one or more gestures. Those gestures may be associated with various controls of the application 246. Thus, the computing system 112 may use the gestures library 240 to interpret movements detected based on the depth images and to control the application 246 based on the movements. As such, gestures library may be used by depth image processing and object reporting module 244 and the application 246.

The camera (e.g., 226) that is used to obtain depth images may be tilted relative to the floor upon which a user is standing or otherwise supporting themselves. To account for such camera tilt, a gravity vector can be obtained from a sensor (e.g., an accelerometer) or in some other manner, and factored in when calculating the depth-based center-of-mass position, the depth-based inertia tensor, the depth-based quadrant center-of-mass positions and/or the depth-based quadrant inertia tensors. Such accounting for camera tilt (also referred to as tilt correction) can be performed on pixels that correspond to a user, before such pixels are used to determine the depth-based center-of-mass position, the depth-based inertia tensor, the depth-based quadrant center-of-mass positions and/or the depth-based quadrant inertia tensors, in the manners described above. In certain embodiments, the tilt correction is performed by computing a rotation matrix, which rotates the gravity vector to a unit-y vector, and the computed rotation matrix is applied to pixels before the pixels are used determine the depth-based center-of-mass position, the depth-based inertia tensor, the depth-based quadrant center-of-mass positions and/or the depth-based quadrant inertia tensors. For example, if an x, y, z gravity matrix were (0.11, 0.97, 0.22), then the computed rotation matrix that would rotate the gravity matrix to be (0.0, 1.0, 0.0). In alternative embodiments, the depth-based center-of-mass position, the depth-based inertia tensor, the depth-based quadrant center-of-mass positions and/or the depth-based quadrant inertia tensors are calculated without tilt correction, and then the computed rotation matrix is applied to the depth-based determinations after they have been determined, to thereby de-tilt the results. In still other embodiments, instead of using a rotation matrix to perform tilt correction, the tilt correction can be performed using a quaternion. Computation of a rotation matrix or a quaternion can be performed using well known standard techniques, as would be appreciated by one or ordinary skill in the art reading this description. Accordingly, it can be appreciated that any depth-based center-of-mass position, depth-based inertia tensor, depth-based quadrant center-of-mass positions and/or depth-based quadrant inertia tensors that is/are used to update an application, as described above, can have already have been tilt corrected.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. It is intended that the scope of the technology be defined by the claims appended hereto.

What is claimed is:

1. A method for using a depth image to extract user behavior, comprising:
    receiving a depth image that specifies that a plurality of pixels correspond to a user,
        wherein the depth image is obtained using a capture device located a distance from the user,
        wherein the depth image also specifies, for each of the pixels corresponding to the user, a pixel location and a pixel depth, and
        wherein the pixel depth, specified for each of the pixels corresponding to the user, is indicative of a distance between the capture device and a portion of the user represented by the pixel;
    determining, for each of the pixels corresponding to the user, a pixel mass that accounts for a distance between the portion of the user represented by the pixel and the capture device used to obtain the depth image; and
    determining, based on the pixel mass determined for each of the pixels corresponding to the user, a depth-based center-of-mass position for the plurality of pixels corresponding to the user that accounts for distances between the portions of the user represented by the pixels and the capture device used to obtain the depth image.

2. The method of claim 1, further comprising:
    using the determined depth-based center-of-mass position to update an application.

3. The method of claim 1, wherein:
    the pixel depth for each pixel is specified by a depth value; and
    the pixel mass, determined for each pixel corresponding to the user, is determined by squaring the depth value that specifies the pixel depth for the pixel.

4. The method of claim 1, further comprising:
    using the determined depth-based center-of-mass position to divide the plurality of pixels corresponding to the user into quadrants; and
    determining a separate depth-based quadrant center-of-mass position for each of the quadrants.

5. The method of claim 4, further comprising:
    using one or more of the determined depth-based quadrant center-of-mass positions to update an application.

6. The method of claim 1, further comprising:
    determining a depth-based inertia tensor for the plurality of pixels corresponding to the user based on the determined depth-based center-of-mass position for the plurality of pixels corresponding to the user.

7. The method of claim 6, further comprising:
    scaling the determined depth-based inertia tensor using an assumption that the plurality of pixels corresponding to the user has a predetermined mass; and
    using the scaled depth-based inertia tensor to update an application.

8. The method of claim 6, further comprising:
    using the determined depth-based center-of-mass position and the determined depth-based inertia tensor to divide the plurality of pixels corresponding to the user into quadrants;
    determining a separate depth-based quadrant center-of-mass position for each of the quadrants; and
    using one or more of the determined depth-based quadrant center-of-mass positions to update an application.

9. The method of claim 8, wherein the using the determined depth-based center-of-mass position and the determined depth-based inertia tensor to divide the plurality of pixels corresponding to the user into quadrants, comprises:
    determining principal axes for the plurality of pixels corresponding to the user based on the determined depth-based inertia tensor, or a scaled version thereof; and
    using one of the determined principal axes, and a line perpendicular to the one of the determined principal axes that intersects the determined depth-based center-of-mass position, to divide the plurality of pixels corresponding to the user into the quadrants.

10. The method of claim 6, further comprising:
    using the determined depth-based center-of-mass position and the determined depth-based inertia tensor to divide the plurality of pixels corresponding to the user into quadrants;
    determining a separate depth-based quadrant center-of-mass position for each of the quadrants;
    determining a separate depth-based quadrant inertia tensor for each of the quadrants; and
    using one or more of the determined depth-based quadrant inertia tensors to update an application.

11. A system that uses depth images to extract user behavior, comprising:
    a capture device that obtains depth images;
    a communication interface that receives depth images from the capture device;
    one or more storage devices that store depth images;
    a display interface; and
    one or more processors in communication with the one or more storage devices and the display interface, wherein the one or more processors are configured to determine, for each of a plurality of depth images a depth-based center-of-mass position for a plurality of pixels of the depth image that correspond to a user, and a depth-based inertia tensor for the plurality of pixels of the depth image that correspond to the user.

12. The system of 11, wherein the depth-based center-of mass position and the depth-based inertia tensor are determined in a manner that accounts for distances between portions of the user represented by the pixels and the capture device used to obtain the depth image.

13. The system of claim 11, wherein the one or more processors use one or more of the determined depth-based center-of mass position or the determined depth-based inertia tensor to update an application running on the system and provide signals on the display interface that indicate an update to the application.

14. The system of claim 11, wherein the one or more processors are also configured to:

use a determined depth-based center-of-mass position and a determined depth-based inertia tensor to divide a plurality of pixels corresponding to the user into quadrants;

determine a separate depth-based quadrant center-of-mass position for each of the quadrants; and use one or more of the determined depth-based quadrant center-of-mass positions to update an application running on the system and provide signals on the display interface that indicate an update to the application.

15. The system of claim 11, wherein the one or more processors are also configured to:

use a determined depth-based center-of-mass position and a determined depth-based inertia tensor to divide a plurality of pixels corresponding to the user into quadrants;

determine a separate depth-based quadrant center-of-mass position for each of the quadrants; and determine a separate depth-based quadrant inertia tensor for each of the quadrants; and use one or more of the determined depth-based quadrant inertia tensors, or scaled versions thereof, to update an application running on the system and provide signals on the display interface that indicate an update to the application.

16. One or more processor readable storage devices having instructions encoded thereon which when executed cause one or more processors to perform a method for using depth images to extract user behavior, the method comprising:

receiving a depth image that specifies that a plurality of pixels correspond to a user;

determining pixel masses for the pixels corresponding to the user;

determining, based on the determined pixel masses for the pixels corresponding to the user, a depth-based center-of-mass position for the plurality of pixels corresponding to the user; and determining a depth-based inertia tensor for the plurality of pixels corresponding to the user based on the determined depth-based center-of-mass position for the plurality of pixels corresponding to the user.

17. The one or more processor readable storage devices of claim 16, wherein:

the determined pixel masses account for distances between the portions of the user represented by the pixels and a capture device used to obtain the depth image; and the depth-based center-of-mass position accounts for distances between portions of the user represented by the pixels and the capture device used to obtain the depth image.

18. The one or more processor readable storage devices of claim 16, wherein the method further comprises:

using at least one of the depth-based center-of-mass position, the depth-based inertia tensor, or a scaled version of the depth-based inertia tensor to update an application.

19. The one or more processor readable storage device of claim 16, wherein the method further comprises:

using the determined depth-based center-of-mass position and the determined depth-based inertia tensor to divide the plurality of pixels corresponding to the user into quadrants;

determining a separate depth-based quadrant center-of-mass position for each of the quadrants; and using one or more of the determined depth-based quadrant center-of-mass positions to update an application.

* * * * *